United States Patent
Nakatsuka

(10) Patent No.: US 8,687,208 B2
(45) Date of Patent: Apr. 1, 2014

(54) PRINTING CONTROL APPARATUS AND PRINTING CONTROL METHOD

(75) Inventor: Tadanori Nakatsuka, Kawasaki (JP)

(73) Assignee: Canon Kabushiki Kaisha (JP)

(*) Notice: Subject to any disclaimer, the term of this patent is extended or adjusted under 35 U.S.C. 154(b) by 734 days.

(21) Appl. No.: 12/435,452

(22) Filed: May 5, 2009

(65) Prior Publication Data

US 2009/0279133 A1 Nov. 12, 2009

(30) Foreign Application Priority Data

May 8, 2008 (JP) .................................. 2008-122778

(51) Int. Cl.
*G06F 3/12* (2006.01)
*G06F 15/00* (2006.01)
*G06Q 10/00* (2012.01)

(52) U.S. Cl.
USPC ....... 358/1.13; 358/1.14; 358/1.15; 358/1.16; 358/1.1; 358/403; 358/404; 705/7.27; 705/300; 705/301

(58) Field of Classification Search
CPC .......... G06F 15/00; G06F 3/12; G06F 3/1296
USPC ............. 358/1.11–1.18, 3.22–3.28, 3.31, 1.1, 358/1.9, 2.1, 400–404; 709/201–203, 709/217–219; 726/26–33; 718/1, 100–108
See application file for complete search history.

(56) References Cited

U.S. PATENT DOCUMENTS

| | | | |
|---|---|---|---|
| 2002/0194245 A1* | 12/2002 | Simpson et al. | 709/101 |
| 2004/0190057 A1* | 9/2004 | Takahashi et al. | 358/1.15 |
| 2004/0193465 A1* | 9/2004 | Sangroniz et al. | 705/8 |
| 2005/0071495 A1* | 3/2005 | Kadota | 709/232 |
| 2005/0105129 A1* | 5/2005 | Takahashi | 358/1.15 |
| 2007/0024901 A1 | 2/2007 | Kayama | |
| 2007/0046989 A1* | 3/2007 | Shima | 358/1.15 |
| 2007/0115493 A1* | 5/2007 | Haginaka et al. | 358/1.14 |
| 2007/0201071 A1* | 8/2007 | Yamada et al. | 358/1.13 |
| 2007/0206212 A1* | 9/2007 | Ohno | 358/1.14 |

FOREIGN PATENT DOCUMENTS

| | | | |
|---|---|---|---|
| JP | 11-143658 A | | 5/1999 |
| JP | 11143658 A | * | 5/1999 |
| JP | 2005-182176 A | | 7/2005 |
| JP | 2007-34846 A | | 2/2007 |
| WO | WO 0125906 A1 | * | 4/2001 |

* cited by examiner

*Primary Examiner* — Chad Dickerson
(74) *Attorney, Agent, or Firm* — Rossi, Kimms & McDowell LLP

(57) ABSTRACT

When the processing of process steps of a print job that includes job definition information showing the process steps of a printing process and information relating to drawing data used in printing is executed by devices, a printing control apparatus connected to the devices determines whether the processing content of a target print job has been changed by the devices from a processing content defined by the job definition information, and, if determined that the processing content has been changed, collects the job definition information defining the changed processing content.

9 Claims, 22 Drawing Sheets

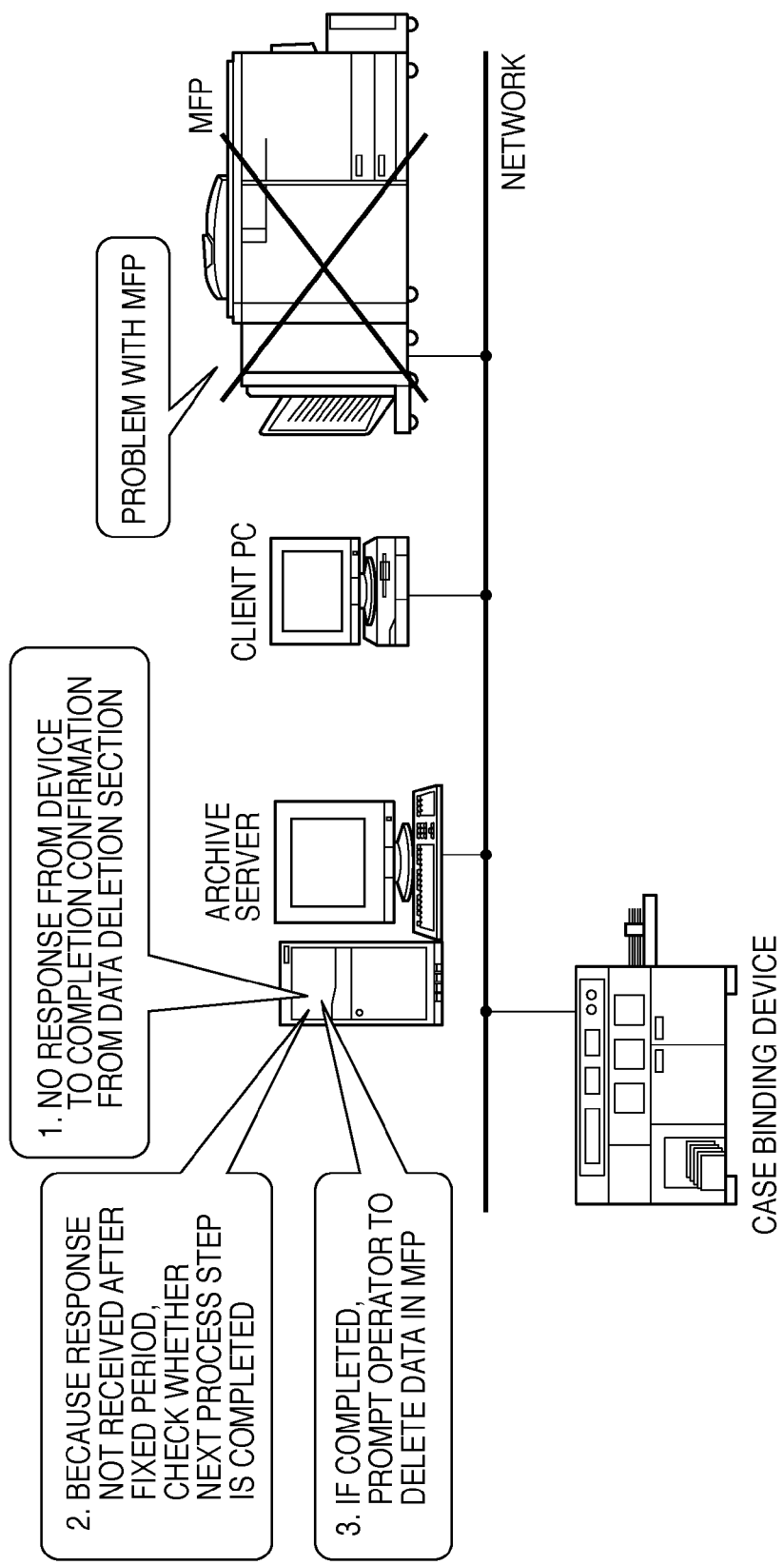

FIG. 16

| DEVICE NAME | PARAMETERS | | | | | | | AMOUNT OF FINE-TUNING (CORRECTION AMOUNT) | | |
|---|---|---|---|---|---|---|---|---|---|---|
| | PAPER STOCK | | | PAPER SIZE | NO. OF SHEETS | ... | FUNCTION | DISPLACEMENT DIRECTION | DISPLACEMENT AMOUNT | CUMULATIVE FREQUENCY |
| | PLAIN PAPER A | HEAVY PAPER B | LIGHT PAPER C | TAB PAPER | | | | | | | |
| Printer - A | – | – | – | ● | – | – | – | PRINT | INSIDE | 0.4 mm | 1 |
| Printer - B | – | ● | – | – | A3 | – | – | PRINT | RIGHT SIDE | 0.2 mm | 3 |
| FOLDING DEVICE | – | ● | – | – | A3, A4 | – | – | FOLD | RIGHT SIDE | 0.5 mm | 8 |
| CUTTING DEVICE | – | – | ● | – | – | – | – | CUT | FAR SIDE | 0.6 mm | 2 |
| CUTTING DEVICE | ● | – | – | – | – | – | – | CUT | FAR SIDE | 0.2 mm | 10 |
| SADDLE STITCH BINDING DEVICE | – | – | – | – | – | – | – | STAPLE | LEFT SIDE | 0.3 mm | 5 |
| CASE BINDING DEVICE | – | – | – | – | – | – | – | – | – | – | 0 |
| ... | | | | | | | | | | | |

PRINTING CONTROL APPARATUS AND PRINTING CONTROL METHOD

BACKGROUND OF THE INVENTION

1. Field of the Invention

The present invention relates to a printing/binding apparatus and a printing/binding method for executing a bookbinding process, for example.

2. Description of the Related Art

The market for print on demand (hereinafter, POD) is expanding in competition with the printing industry, with the advent of high-speed, high-quality electrophotographic printing apparatuses and inkjet printing apparatuses. POD offers an alternative to large-scale printers and printing techniques, eschewing large apparatuses and systems, and aiming to handle relatively small print run jobs compared to those of the printing industry in a short turnaround time. With printing/binding that uses POD, print data is generally stored in a storage area of an HDD in a POD apparatus called a hold queue. Subsequently, an operator performs one copy of printing/binding from the POD apparatus using print data in the hold queue, and checks the print content and the state of the binding. This is called a test print. If the test print is satisfactory, the operator performs the actual print to execute printing/binding for the remaining 100 copies, for example. Note that in this specification, the hold queue may also be called a BOX.

Conventionally, data remaining in the BOX and servers is deleted after the actual print is completed if data deletion is required immediately. If this is not the case, the data is often held for a while in case of a reprint. When printing highly confidential data, data in the BOX used in the test print and the actual print is manually deleted in the POD apparatus at the same time that the printed material is acquired.

Mechanisms for automatically deleting data have been proposed in contrast to this manual deletion of data. For example, there is an order data management system for storing the data and design templates of customers in order folders corresponding to the customer orders, and managing the order folders per order. With this system, an automated deletion process divided over multiple stages per order folder is performed. For example, customer data is deleted after one week, and design templates are deleted after two weeks (e.g., see Japanese Patent Laid-Open No. 2005-182176).

A technique has also been proposed in which a client apparatus renders print data that is no longer required electronically nonreproducible, after transferring the print data to a printing apparatus such as an MFP (e.g., see Japanese Patent Laid-Open No. H11-143658). Further, with this technique, confidentiality is retained by rendering data that is no longer required electronically nonreproducible after the completion of processing, even in the individual bookbinding devices such as print servers and printing apparatuses to which the print data was transferred.

There are also techniques that allow the operator to remain at the printing apparatus in the case where there are modifications that cannot be performed by the printing apparatus, by transmitting a modification request from the bookbinding device to an information processing apparatus such as a PC that manages the bookbinding device, and instructing that the job be rewritten (e.g., see Japanese Patent Laid-Open No. 2007-34846).

However, since BOX data is deleted after printing is completed, it was necessary to again import the manuscript data, configure the binding settings, and store data to a BOX when an error or jam during binding or a problem during packaging/shipping was discovered after the BOX data had been deleted. Also, print settings and binding settings that had been fine-tuned at a device after a test print needed to be readjusted when reprinting was performed, since these settings were deleted together with the BOX data. Further, since job definition format (JDF) files constituting information defining print workflows contain content names and the like, there was a risk of customer information being inferred from the JDF files.

SUMMARY OF THE INVENTION

The present invention has been made in consideration of the above conventional technology, and has as its object to solve these problems. More specifically, the present invention provides a printing system, a printing control apparatus and a printing control method that balance protection of information included in print data with reuse of information used in printing.

To solve the above problems, the present invention is provided with the following configuration. That is, a printing control apparatus connected to a device for executing processing of each process step of a print job that includes job definition information showing a process step of a printing process and information relating to drawing data used in printing includes a determination unit that determines whether a processing content of a target print job has been changed by the device from a processing content defined by the job definition information, and a collection unit that, if determined by the determination unit that the processing content has been changed, collects the job definition information defining the changed processing content.

The present invention enables protection of information included in print data to be balanced with reuse of information used in printing.

Further features of the present invention will become apparent from the following description of exemplary embodiments with reference to the attached drawings.

BRIEF DESCRIPTION OF THE DRAWINGS

FIG. 15 shows an example in which a problem occurs with a device according to the present invention.

FIG. 16 shows an exemplary fine-tuning database according to the present invention.

DESCRIPTION OF THE EMBODIMENTS

First Embodiment

Brief Description of System

Figure 1:
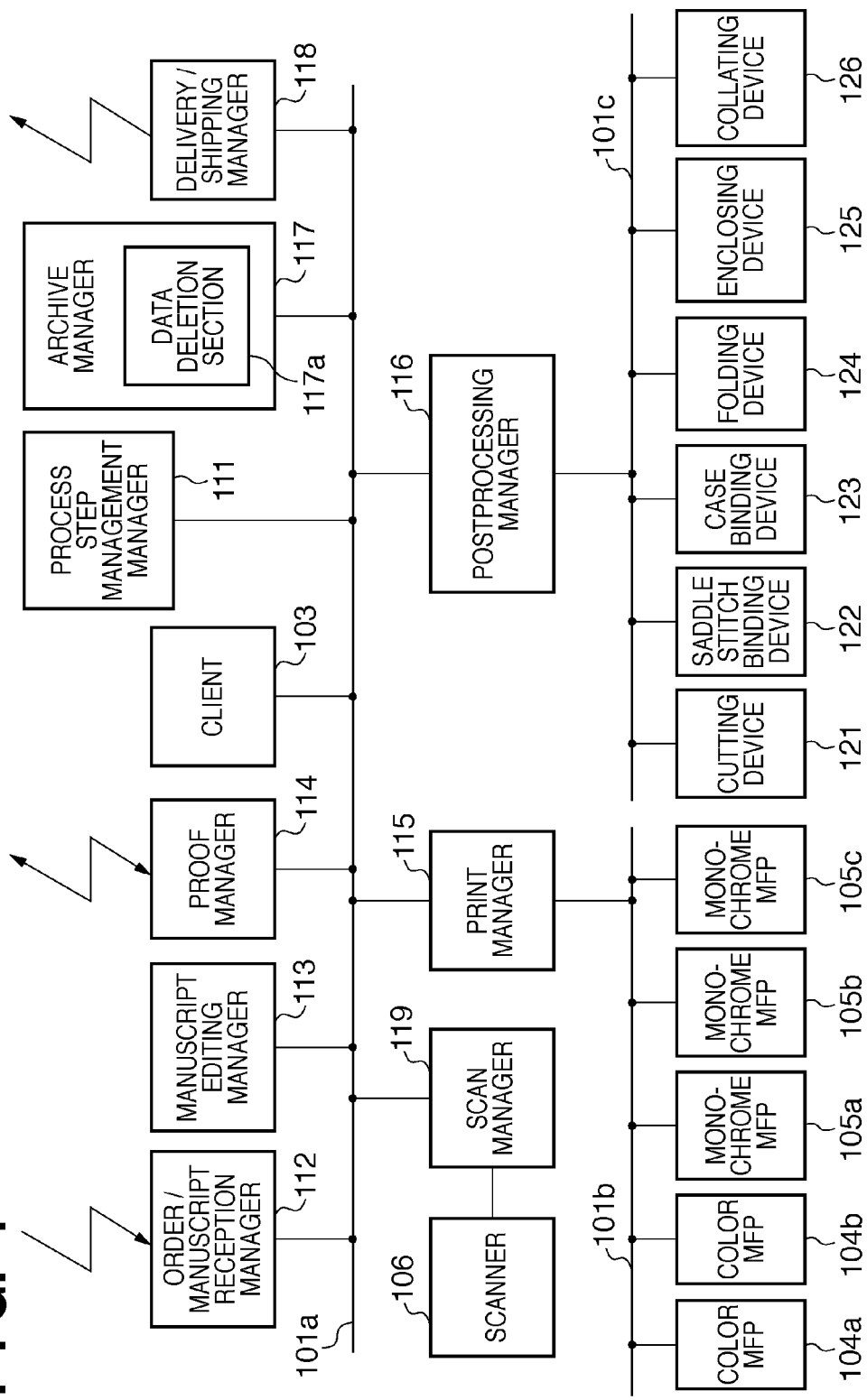
FIG. 1 is a block diagram showing the overall system according to the present invention.

FIG. 1 is a block diagram showing an exemplary configuration of an image forming system (or a printing system) showing a first embodiment of the present invention. As shown in FIG. 1, the apparatuses constituting the image forming system of the present embodiment are connected by a network 101. The network 101 may be a single system or comprise multiple systems such as 101a, 101b and 101c as shown in FIG. 1.

The image forming system is equipped, for example, with multifunction devices such as color MFPs 104a and 104b and monochrome MFPs 105a to 105c that have multiple functions and can print electronic data from a scanner unit or an external device such as a computer. The image forming system is further equipped with a device equipped with only a scanner function such as a scanner 106 and a single function device such as a device (not shown) equipped with only a print function.

The image forming system is also equipped with various types of sheet processing (postprocessing) apparatuses that can execute sheet processing treatment on sheets (print media) printed by a printing device such as a multifunction device. Note that the sheet processing treatment is equivalent to at least one of multiple types of postprocessing such as cutting, stapling, folding, binding (e.g., saddle stitch binding, case binding), enclosing and collating. For example, the system is equipped with a cutting device 121 that cuts recording paper printed by a printing device on an axis of a prescribed portion thereof (e.g., right edge or top, right and bottom edges of the recording paper, or the middle of the recording paper), as an exemplary sheet processing apparatus. The system is also equipped with a saddle stitch binding device 122 that performs a stapling process on printed recording paper using a stapling unit in a central middle portion of the recording paper, and subsequently folds the recording paper with the central middle portion as the central axis to create a saddle stitched product. The system is also equipped with a case binding device 123 that performs a case binding process which involves aligning the backs of recording paper printed by a printing device (alignment process), adhering a portion of the aligned backs with special glue, encasing the adhered recording paper in a cover, and pressing the encased recording paper.

The system is also equipped with a folding device 124 that can perform a folding process on recording paper printed by a printing device. The system is also equipped with an enclosing device 125 that houses and seals recording paper that has been printed by a printing device and undergone sheet processing treatment by a sheet processing apparatus or the like in a prescribed enclosing body such as an envelope. The system is also equipped with a collating device 126 that can execute a collation process (arranging the recording paper in correct page order) on recording paper printed by a printing device. Note that while the system of the present embodiment will be described with an exemplary configuration that can thus execute multiple types of sheet processing treatment per sheet processing apparatus, the system is not limited to such a device configuration. For example, a given sheet processing apparatus may be configured to be able to execute multiple types of sheet processing treatment such as stapling, binding and folding, or a single sheet processing apparatus may be mechanically configured to be able to execute only one sheet processing treatment. In either case, the present embodiment is applicable provided the device configuration and system configuration can execute sheet processing treatment of a configuration desired by a user (customer).

As described above, the image forming system has multiple types of devices such as printing devices (also called image forming apparatuses) and sheet processing apparatuses. These multiple devices are equipped with a communication unit, and are configured to be able to provide and receive data (image data, print condition data, control data, status request data, status data, etc.) via a prescribed communication medium such as the network 101.

In FIG. 1, a process step management manager 111 is realized by a computer. The process step management manager 111 manages the process steps of all jobs (also called print jobs) that flow through the computers, devices, and the image forming system. There are jobs of various statuses including currently executing jobs whose processing (e.g., printing) is currently being executed, ready jobs that are waiting for the start of processing after a print request has been issued, completed jobs that have been output, and error jobs where an error has occurred. The process step management manager 111 acquires various data from each device including information relating to the job reception condition, information relating to the device status (operation status, error status, etc.) and job progress information relating to the job processing status. The process step management manager 111 is thereby configured to be able to ascertain jobs to be processed in each device and the system and manage the process steps of each job. Note that a job to be processed is called a target job (or a target print job). An order/manuscript reception manager 112 receives manuscript data from a user interface unit (e.g., client computer) of a user (customer) via a prescribed communication medium such as the Internet. A manuscript editing manager 113 processes jobs that are based on received manuscript data or image data read by a scanner, in the page order and layout requested by the user. Note that image data (manuscript data) to be printed on recording paper and print setting data that includes various output conditions such as print copy number settings, image processing settings and finishing process settings are collectively called job data.

A proof manager 114 is configured to be able to perform data communication with devices such as a client computer via a communication medium such as the Internet. The proof manager 114 displays a job whose manuscript data has been edited in accordance with output conditions from the client or an output sample of the job via a user interface unit such as the display of a client computer. This is to allow the user (customer) to check whether the printed material is as he or she intended (proofing or proofreading process). For example, the proof manager 114 receives manuscript data and output condition data specifying how to process the manuscript data (various processing condition data relating to editing and finishing processes such as color editing, scaling and layout) from the client computer. The proof manager 114 processes received manuscript data in accordance with the output condition data set for that manuscript data, using an editing unit included in the proof manager 114 or an editing unit included in another device. The proof manager 114 then returns the processed manuscript data to the client computer before the actual printing by a printing device and displays the processed manuscript data on a display of the client computer to enable the client to check the processing result. The system is configured to be able to actually start the printing process once the processing result has been checked by the user. Thus, the system is able to provide the output result desired by the client, without producing an improper output result that differs from the desired output result.

The proof manager 114 thus allows print preprocessing such as manuscript editing and proofing to be executed before actually executing the printing process. Note that the proof manager 114 provides edited image data to the client via the UI of the client computer, performs control such that once an acceptance instruction indicating that the user is satisfied with the processing result is input via the UI of the client computer, the processing of the job is, in response, passed to a print manager 115 that performs the next process step. On the other hand, the editing process is executed again if, for example, a reediting instruction is input from the client computer, rather than an acceptance instruction being obtained from the client. The proof manager 114 can repeat this process step (proofing of target job) until processed manuscript image data that satisfies the client is obtained.

The print manager 115 performs a rasterizing process (conversion to bitmap image data) on target manuscript data that has undergone print preprocessing (manuscript editing, proofing) by the proof manager 114. The print manager 115 then performs control to transfer the rasterized manuscript data to a printing device serving as the print output destination, and cause the printing device to print out (printing process) the manuscript data.

A postprocessing manager 116 controls the sheet processing apparatuses to perform a postprocessing (finishing) process step that conforms to the output condition data of the job received by the order/manuscript reception manager 112 on the recording paper printed by a printing device. Postprocessing includes sheet processing treatment performed on the recording paper such as a cutting process step, a saddle stitch binding process step, a case binding process step, a folding process step, an enclosing process step, and a collation process step. The sheet processing apparatuses include the cutting device 121, the saddle stitch binding device 122, the case binding device 123, the folding device 124, the enclosing device 125 and the collating device 126.

An archive manager 117 is a file server that archives user jobs (including image data for printing to recording paper) and responds to reprint requests. For example, the archive manager 117 holds printed image data in a memory unit such as a hard disk even after manuscript data received by the order/manuscript reception manager 112 has been printed in an output configuration desired by the client. The archive manager 117 reads out printed manuscript data held in the memory unit if a further output request instruction for a printed job is issued by the client via the order/manuscript reception manager 112. The archive manager 117 is then able to reprint the image data with a printing device in a desired output configuration newly set by the client when the output request is issued. The archive manager 117 is thus configured to be able to limit unnecessary data communication as much as possible by improving reuse of printed image data and avoiding the same data being received over and again from the client.

The archive manager 117 includes a data deletion section 117a. A feature of the printing system according to the present embodiment lies particular in this data deletion section 117a. Operation of the data deletion section 117a will be described in detail below.

A delivery/shipping manager 118 is configured to be able to perform data communication with other devices via a communication medium such as the Internet. The delivery/shipping manager 118 performs, for example, a printing completion process in response to printing completion notification data indicating completion of printed material being received from one of the devices in the system. The printing completion process includes, for example, instructing an operator of a device to deliver printed material to a client via the UI of the device, or managing the delivery slip data and shipping history data of printed material.

A scan manager 119 can, in response to receipt of a paper manuscript, digitize the paper manuscript as data that can be handled in a printing device or the like by reading the paper manuscript with the scanner 106.

Note that the managers 111 to 118 may be respectively constituted by individual information processing apparatuses (e.g., host computers, servers), or may be constituted such that all or a plurality of the functions of the managers 111 to 118 are realized by a single information processing apparatus. For example, a single host computer, server or the like capable of executing all of the functions of the managers 111 to 118 may be incorporated into the system. Individual host computers, servers or the like may also be respectively incorporated into the system for each of the managers 111 to 118. Host computers, servers or the like each capable of executing the functions of some of the managers may also be incorporated into the system. Any configuration is possible provided the device configuration and system configuration are capable of executing the various controls mentioned in the present embodiment.

A client computer 103 (client) is capable of accessing the managers. For example, the client computer 103 is able to transmit image data that the user wants to print/create to the order/manuscript reception manager 112 together with printout condition data for the image data. The client computer 103 is also able to receive edited manuscript image data from the proof manager 114 in order to check the end result of the manuscript requested to be printed. The client computer 103 is also configured to be able to receive printing completion notification data from the delivery/shipping manager 118 as receipt of a printing completion notification. The client computer 103 is also configured to be able to execute various print settings, image confirmation and the like by the user via a display or other UI of the client computer 103. The managers, being apparatuses for controlling the printing process, may also be called printing control apparatuses.

Figure 22:
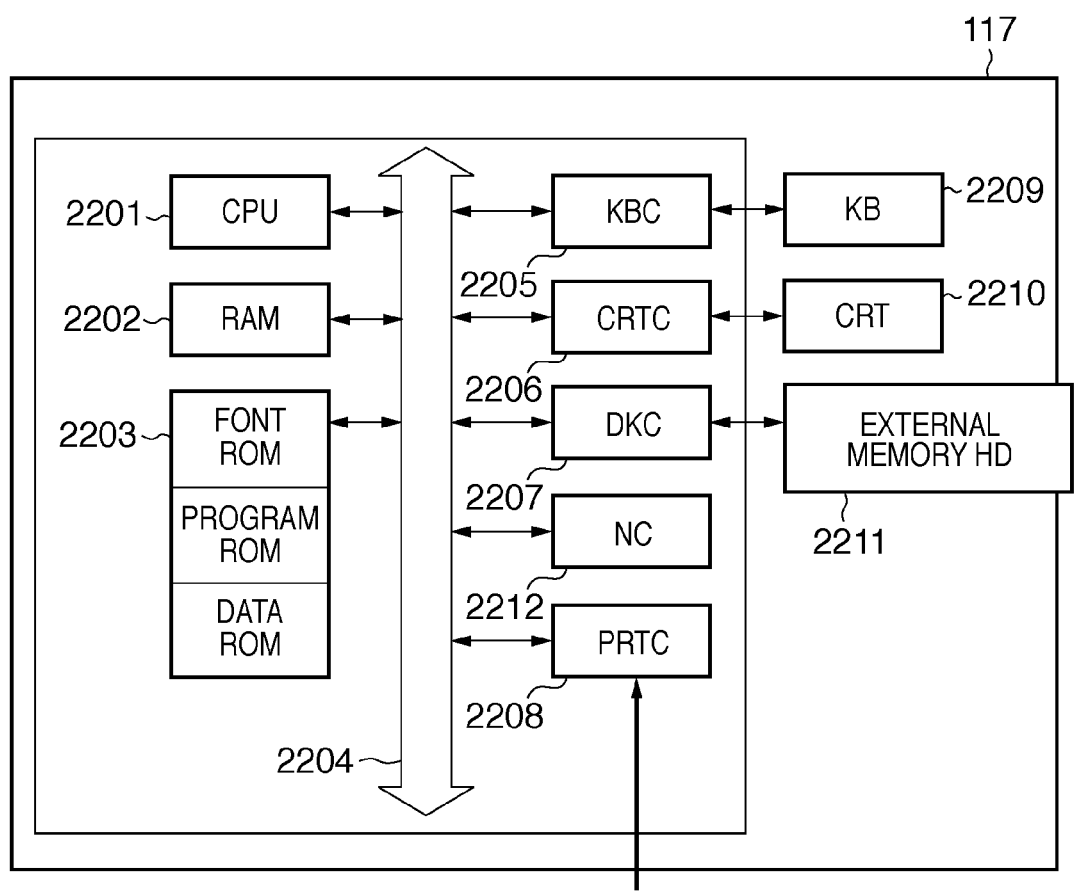
FIG. 22 shows an exemplary hardware configuration of a server and a client PC according to the present invention.

FIG. 22 shows an exemplary hardware configuration of the archive manager 117 of the present embodiment. Note that the managers (servers) and client PCs of the present application basically have the hardware configuration shown in FIG. 22. The archive manager 117 is provided with a CPU 2201 that executes document processing on documents composed of graphics, images, text and charts (including spreadsheets, etc.) based on a document processing program stored in a ROM 2203 or an external memory 2211. With the archive manager 117, the CPU 2201 performs overall control of the devices connected to a system bus 2204. An operating system program, which is a control program of the CPU 2201, is stored in a program ROM of this ROM 2203 or the external memory 2211. Font data and the like to be used in document processing is stored in a font ROM of the ROM 2203 or the external memory 2211, and various data to be used when performing document processing or the like is stored in a data ROM of the ROM 2203 or an external memory 2211. A RAM 2202 functions as a main memory, work area or the like of the CPU 2201.

A keyboard controller (KBC) 2205 controls key inputs from a keyboard 2209 or a pointing device (not shown). A CRT controller (CRTC) 2206 controls display on a CRT display (CRT) 2210. A disk controller (DKC) 2207 controls access to the external memory 2211 such as a hard disk (HD) or a flexible disk (FD) that stores files. Stored files includes a boot program, various applications, font data, user files, editing files, printer control command generation programs (hereinafter, printer drivers) and the like. A printer controller (PRTC) 2208 is connected to an external device via an interactive interface (interface) 2221, and executes communication control processing with the external device. A network controller (NC) 2212 is connected to a network, and executes communication control processing with other devices connected to the network.

Note that the CPU 2201 executes a development (rasterizing) process on an outline font to a display information RAM set in the RAM 2202, for example, enabling WYSIWYG on the CRT 2210. The CPU 2201 opens various windows registered based on commands instructed with a mouse cursor or the like (not shown) on the CRT 2210, and executes various data processing. The user, when executing printing, is able to open windows relating to print settings, and configure the external device and the printing method for the printer driver including print mode selection.

Hereinafter, the roles of each of the managers shown in FIG. 1 will be described in further detail.

Process Step Management Manager 111

The process step management manager 111 functions as a central management system called a management information system (MIS). Thus, the process step management manager 111 is also called an MIS server. The process step management manager 111 assists management planning and administrative tasks through the gathering, processing and reporting of production-related data, and is able to accumulate information and to provide accumulated information to required sections when necessary.

The process step management manager 111 is a computer that is central to this management information system. The process step management manager 111 acts to centrally manage information, including areas that were in the past beyond being centrally managed due to the limitations of human capabilities, by performing data communication with devices and generating an information database. Areas that were in the past beyond being centrally managed include, for example, processing executed after an intervening operation by an operator, which was other than an operation completed only by machine.

The process step management manager 111 performs scheduling of decision-making applications and particularly products (e.g., printed material generated in the system), with reference to the stored data (e.g., function and capacity information on the devices, status information on the devices, and status and progress information on received jobs). Thus, the process step management manager 111 is used to enhance production capacity planning by instructing and managing work process steps such that the operator is able to work efficiently.

Order/Manuscript Reception Manager 112

The order/manuscript reception manager 112 shown in FIG. 1 receives orders from client computers via a communication medium such as the Internet, for example, as an intermediary in so-called electronic commerce (EC). The order/manuscript reception manager 112 is, from the user's standpoint, also an electronic store using web pages on the Internet. After user authentication has been performed by the order/manuscript reception manager 112, the user is able to issue a job order by sending a desired file to the order/manuscript reception manager 112 from his or her computer as electronic data together with desired settings.

Figure 2:
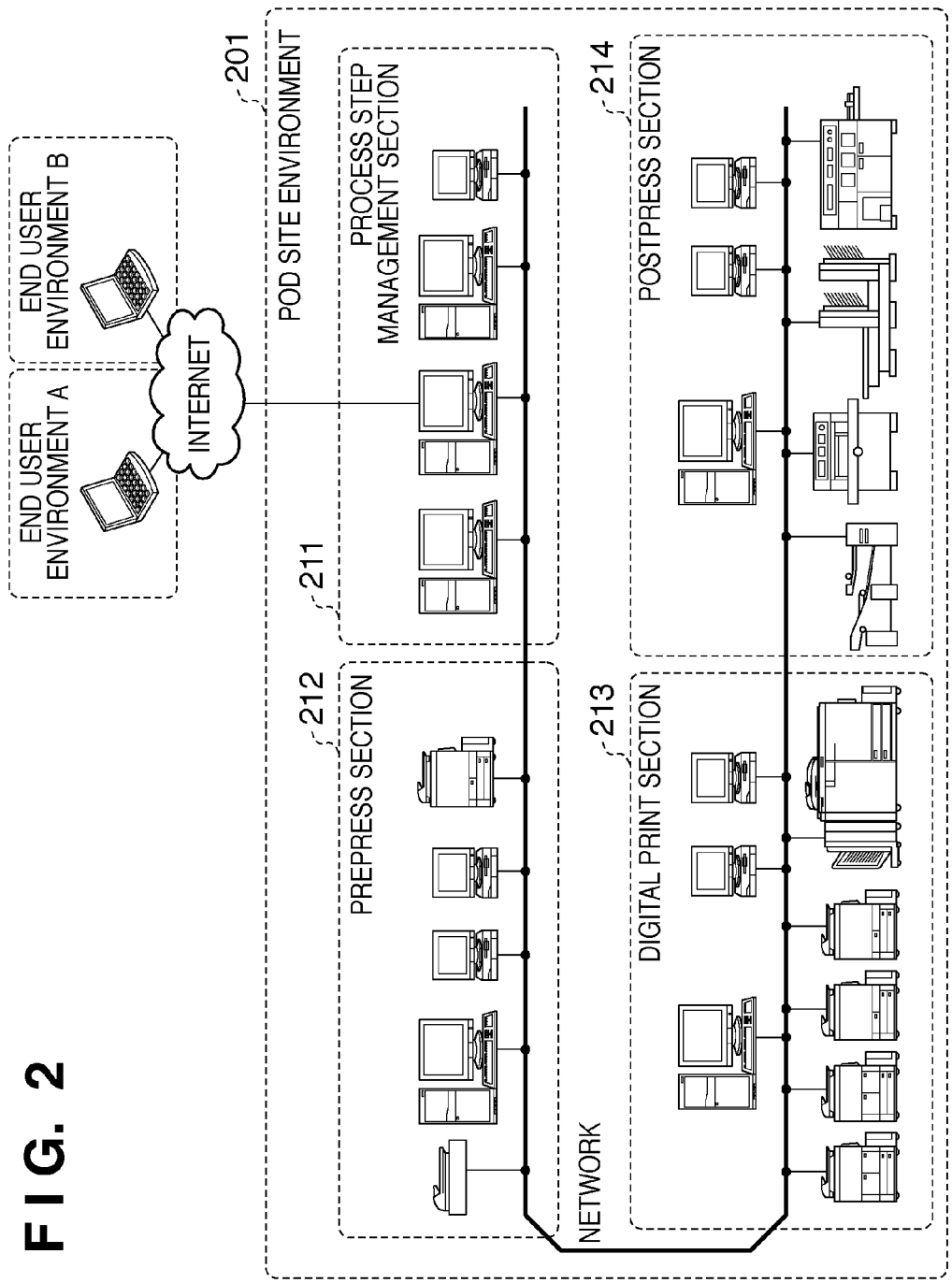
FIG. 2 is a system configuration diagram according to the present invention.
Figure 4:
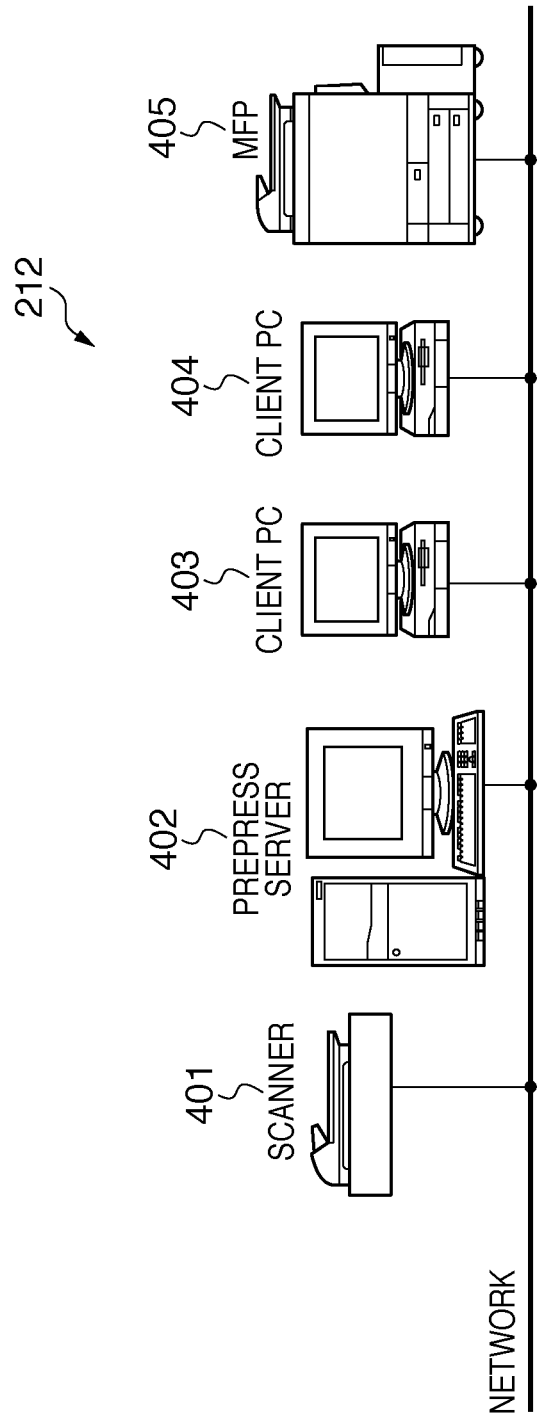
FIG. 4 is a configuration diagram of a prepress section according to the present invention.

FIG. 2 schematically shows FIG. 1. A process step management section 211 is equivalent to the process step management manager 111, a digital print section 213 is equivalent to the print manager 115 and the printing devices, and a postpress section 214 is equivalent to the postprocessing manager 116 and the sheet processing apparatuses. A prepress section 212 includes a scanner 401, a prepress server 402, client PCs 403 and 404 and an MFP 405 for performing test prints, as shown in FIG. 4.

Figure 3:
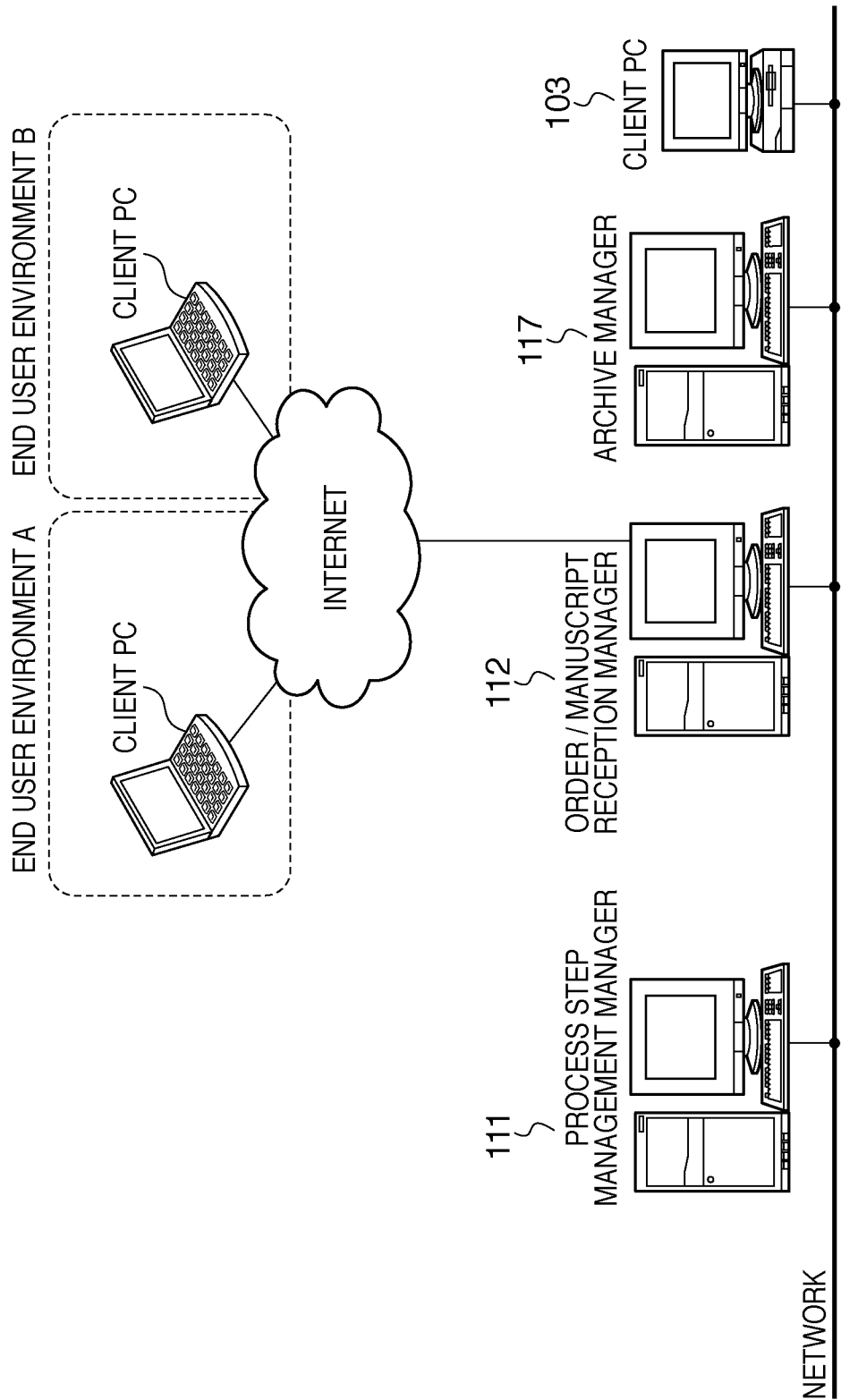
FIG. 3 is a configuration diagram of a process step management section according to the present invention.

FIG. 3 shows the process step management section of FIG. 2 in detail. The process step management manager is a server that performs overall management of various management information and sales information, as well as managing the workflow of the entire system from ordering to delivery. The process step management manager also executes a job definition format (JDF) creation application for creating JDF data (also called job definition information), which is equivalent to a job ticket describing the work instructions of the workflow. In the present embodiment, the process step management manager is also called a workflow management server. Devices, application programs, parameters and the like for executing the process steps defined in the workflow are described in the JDF data. JDF data is transmitted to devices as a job ticket, and also saved to the archive manager 117 until deleted. A device (including a computer) that receives a job ticket performs designated processing in accordance with parameters described in the job ticket. After performing the designated processing, the device writes the state after processing to the job ticket and returns the job ticket to the process step management manager 111. Job tickets are thereby transmitted sequentially to the devices performing the process steps. Consider, for example, a workflow that consists of "printing", "cutting" and "binding" of manuscript data. In this case, the job ticket transmitted to the printing device contains the filename of the file to be printed, the name of the device that will perform the printing, the print settings and the like. Once printing has been performed, the printing device writes the settings and the like that are reflected in the output printed material such as the sheet number per copy, number of copies and paper size to the job ticket, and returns the job ticket to the process step management manager 111. In order to perform the next process step, which is the cutting process, the process step management manager 111 transmits a job ticket containing the device ID of the cutting device, the cutting location and the paper size to the device that will perform processing, based on the job ticket received from the upstream process step. Similar processing is performed for each process step.

Figure 5:
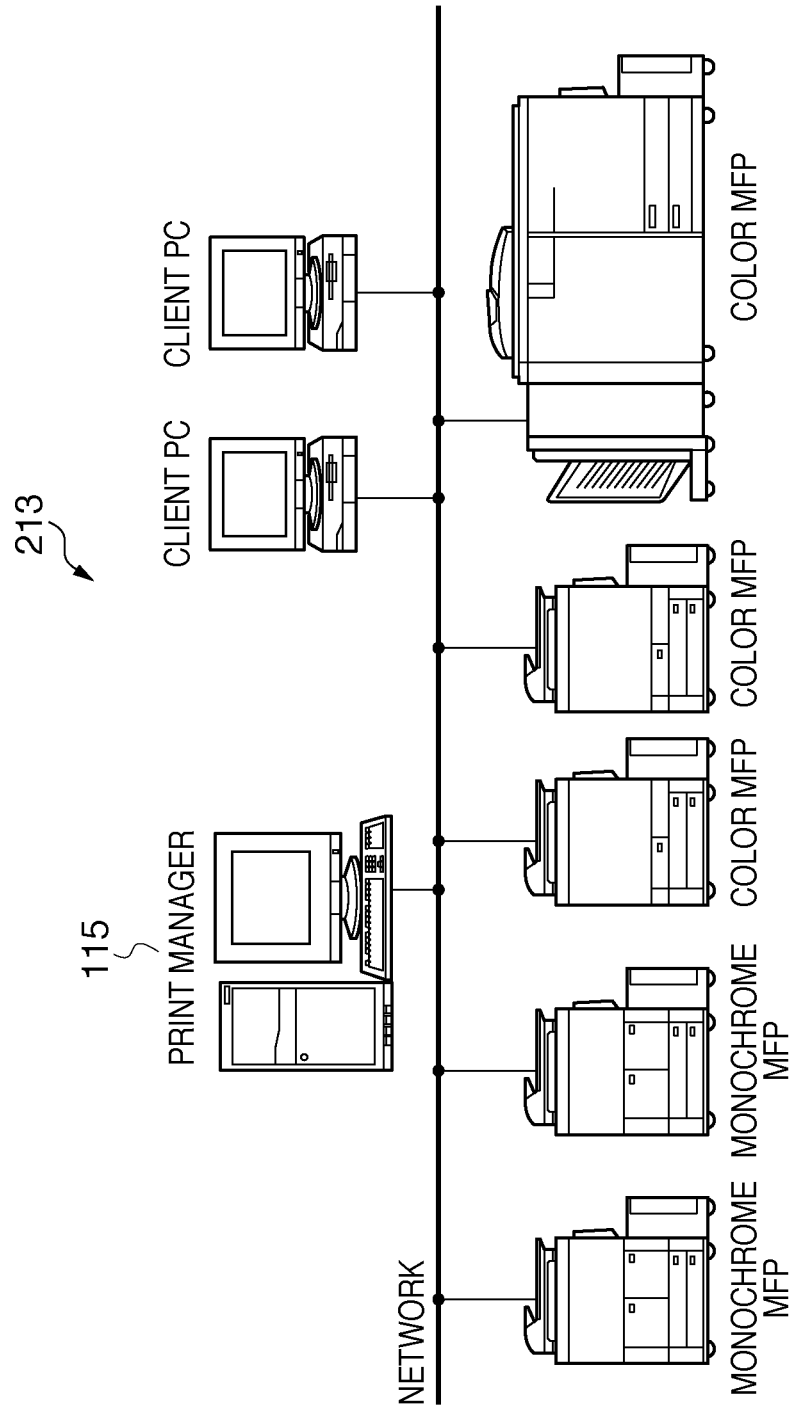
FIG. 5 is a configuration diagram of a print section according to the present invention.
Figure 6:
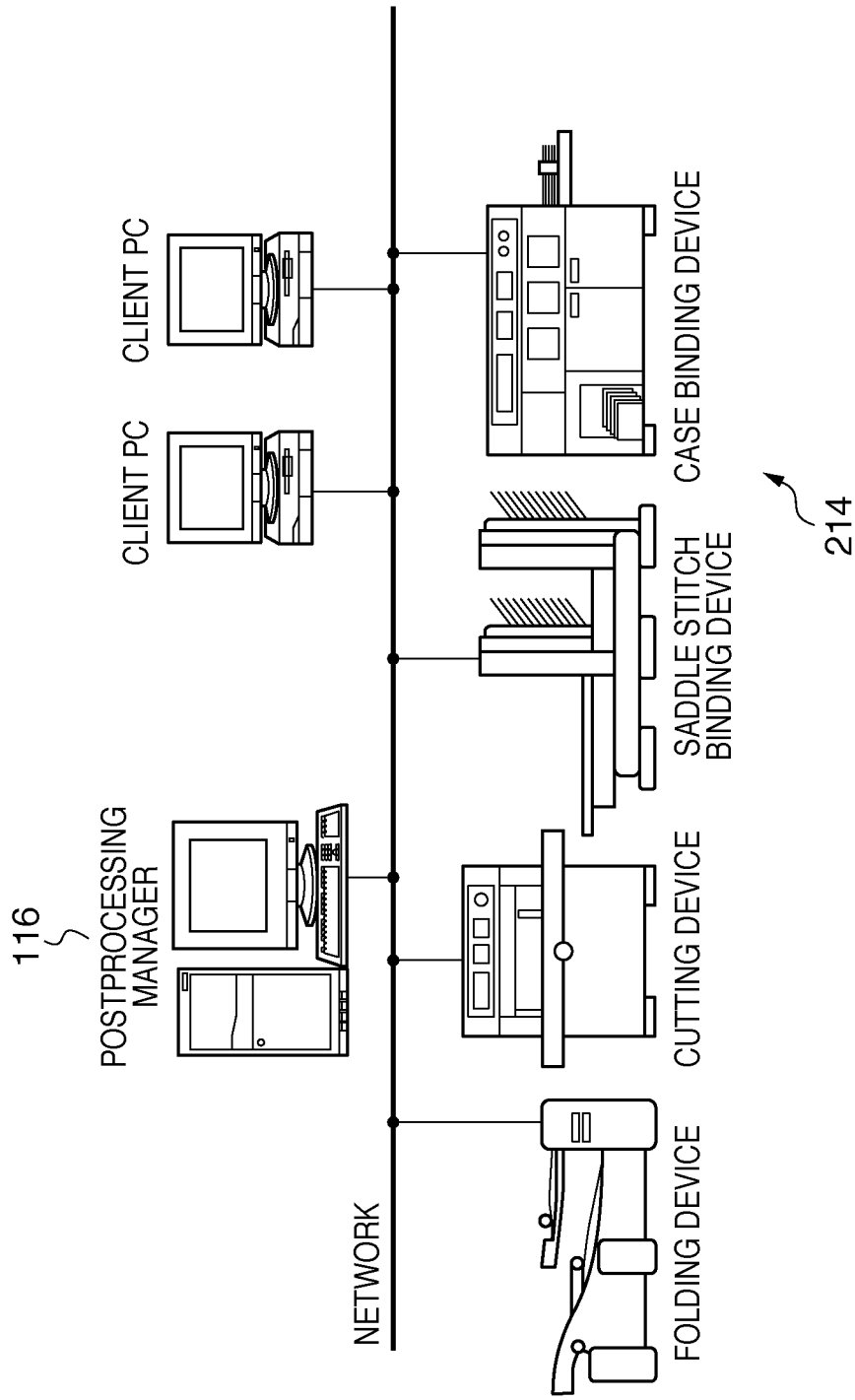
FIG. 6 is a configuration diagram of a postpress section according to the present invention.

FIG. 5 shows the digital print section of FIG. 2 in detail. FIG. 6 shows the postpress section of FIG. 2 in detail.

Figure 19:
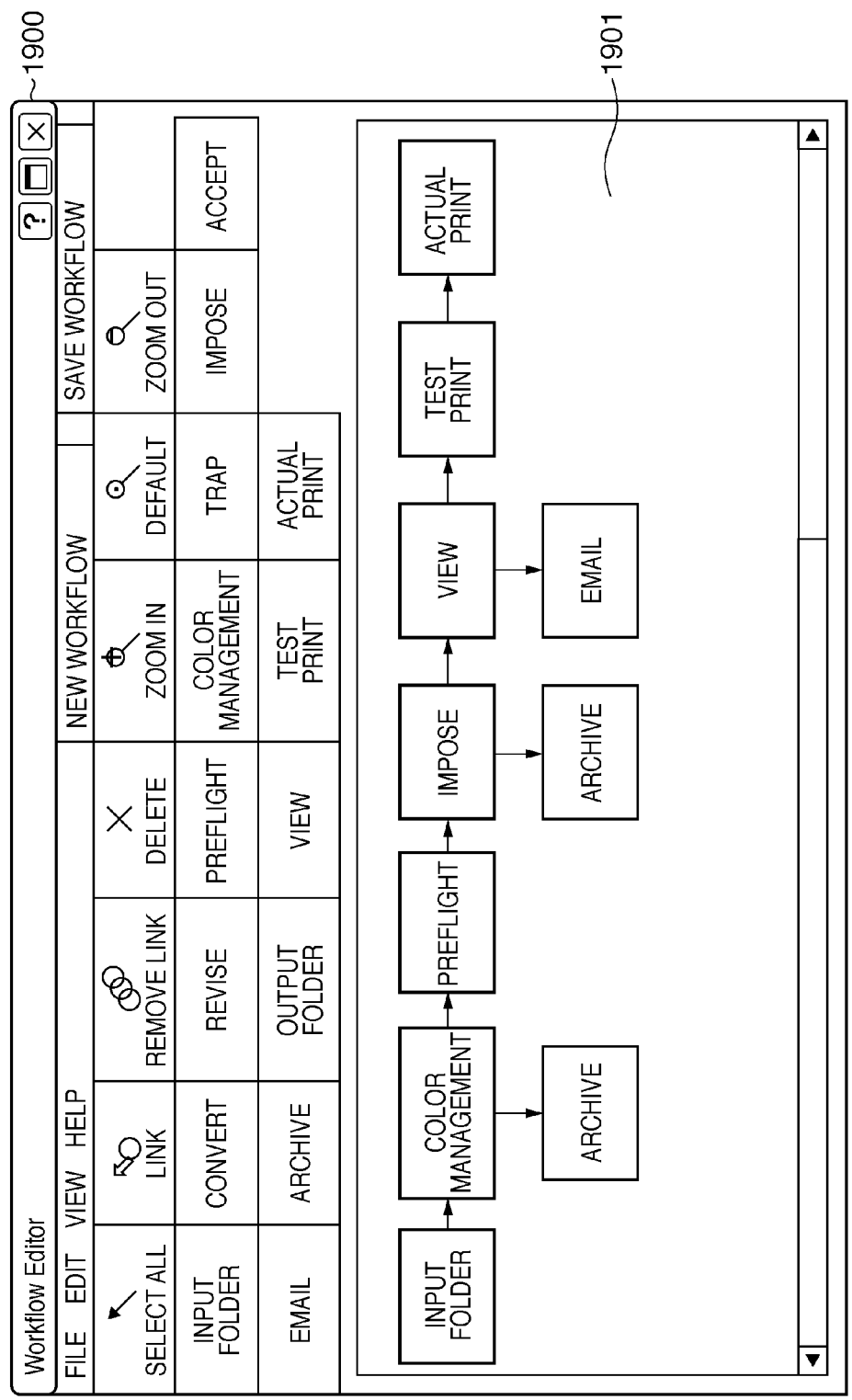
FIG. 19 shows exemplary UI of a workflow editor according to the present invention.

FIG. 19 shows an exemplary setting screen 1900 of a workflow editor in the process step management manager 111. At the top of setting screen of the workflow editor are arranged the File, Edit, View, and Help menus for executing the various processing of the workflow editor.

The New Workflow button and Save Workflow button arranged on the toolbar are respectively for creating a new workflow, and a saving a created workflow.

The Select All button and Link button arranged on the next level of the toolbar are respectively for selecting all modules that exist in the work area below, and for linking a plurality of selected modules in the work area. The Cancel Link button and Delete button are respectively for cancelling the linking of selected modules in the work area, and for deleting selected modules in the work area. The Zoom In button, Default button and Zoom Out button are respectively for enlarging the display of the work area, for returning the display of the work area to default, and for reducing the display of the work area.

Buttons for arranging the various modules in a work area 1901 below are arranged on the following level of the toolbar. These buttons include Input folder, Convert, Revise, Preflight, Color management, Trap, Impose, Accept, Email, Archive, Output folder, View, Test print, and Actual print.

Firstly, when creating a new workflow, the operator presses the New Workflow button, and, on a screen (not shown), selects a template, which will serve as a model, and inputs a pathname and a workflow name, which are required to save a file.

Next, when adding a new module to the workflow configured in the work area, the operator adds the new module by dragging and dropping one of the buttons from Input Folder to Actual Print using a pointing device. When linking two modules, the operator selects two relevant modules in the work area and presses the Link button.

The following example is shown on the screen. That is, the operator has created a workflow in which input data (Input folder) is archived (Archive) after undergoing color management (Color management). The data also undergoes a preflight check (Preflight) and is imposed (Impose), before again being archived (Archive). The data is then notified by email (Email) after being checked (View), and actual printing (Actual print) is performed after performing a test print (Test print). In terms of the process steps of the workflow, more detailed attribute information can be set for the modules using menus displayed by right clicking on the modules with a pointing device.

Having finished creating a workflow, the operator saves the file in which the workflow is defined by pressing the Save Workflow button and ends the processing.

Figure 7:
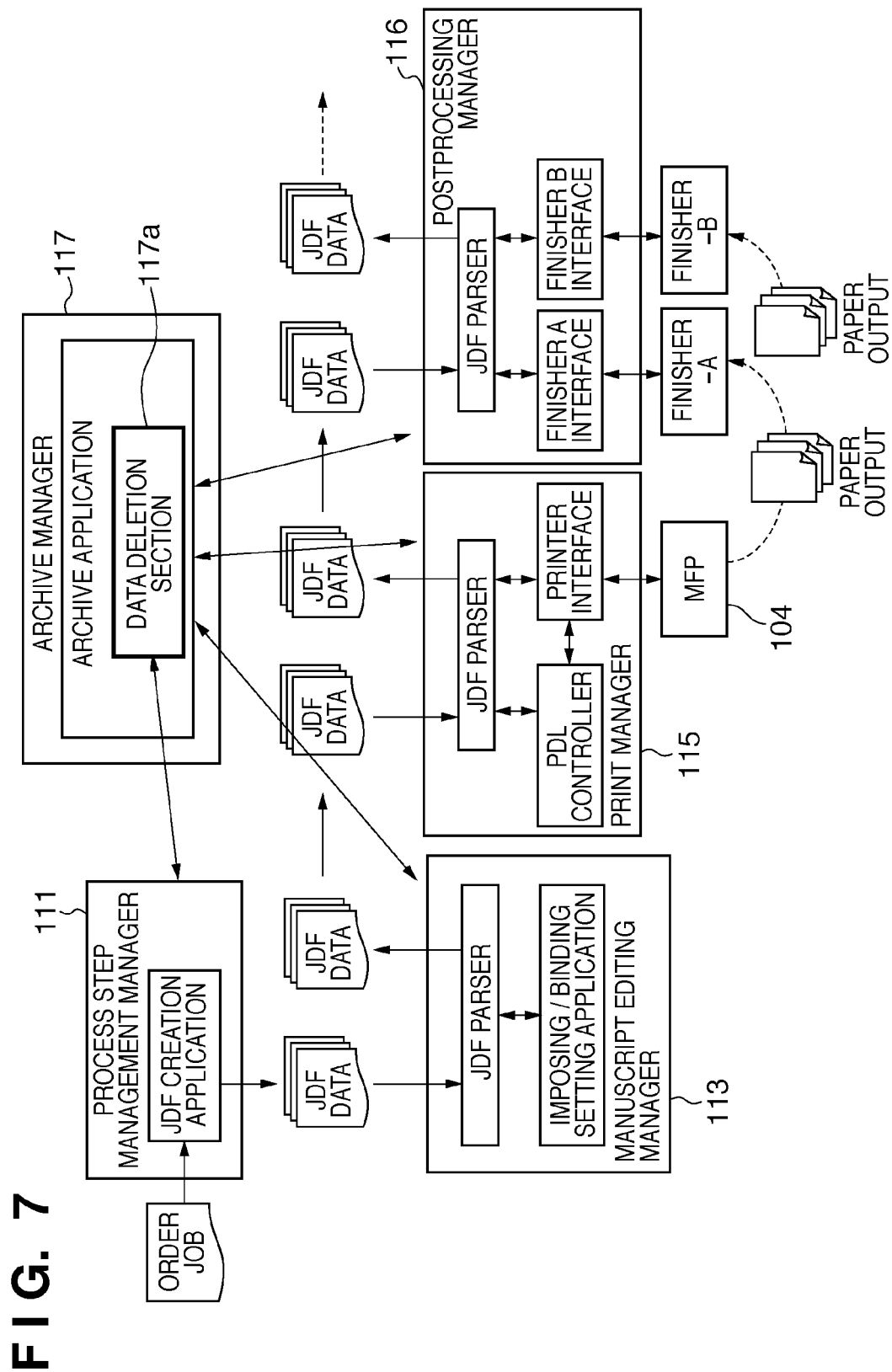
FIG. 7 shows an exemplary flow of JDF data according to the present invention.

FIG. 7 shows an exemplary workflow configuration realized using a job ticket. The process step management manager 111 executes a JDF creation application for creating JDF data, which is equivalent to a job ticket describing the work instructions of the workflow. The workflow describes, for example, the processing to be performed on the manuscript data, the processing parameters, and the devices that will execute the processing.

The manuscript editing manager 113 is a server for configuring the imposing and binding settings based on work instructions, and is constituted by a JDF parser for interpreting JDF data, and an imposing/binding setting application for configuring the imposing and binding settings.

The print manager 115 is a server for receiving jobs input to the digital print section, and managing and controlling the entire digital print section. The print manager 115 is constituted by a JDF parser for interpreting JDF data, a PDL controller for processing various PDL data such as PDF/PS, and a printer interface for connecting to the printer engine of an MFP or the like.

The postprocessing manager 116 is a server for receiving jobs input to the postpress section, and performing overall management of the entire postpress section. The postprocessing manager 116 is constituted by a JDF parser for interpreting JDF data, and a finisher A interface and a finisher B interface for connecting to a finisher A and a finisher B. Of course, if there are three or more sheet processing devices, the postprocessing manager 116 may have a configuration for connecting to these devices.

A workflow using a job ticket is realized as follows. When an order job is input to the process step management manager, a JDF creation application installed on the process step management manager creates JDF data for the job. The JDF data is equivalent to a job ticket in which the work instructions of the workflow are described. The job ticket describes the data to be processed, the process steps, the processing parameters, and the devices that will execute the process steps. The job ticket is sent to the next process step on completion of each process step, with the content thereof being altered according to the content of the completed processing. For example, when manuscript data has been imposed and printed, the number of printed sheets is written to the job ticket, which is then sent to the downstream process step, where bookbinding is performed for every designated number of sheets.

So, the created JDF data is passed to the manuscript editing manager 113, where the JDF parser in the manuscript editing manager 113 interprets the JDF data and conveys information to the imposing/binding setting application. The imposing/binding setting application configures the imposing/binding settings based on the work instructions described in the JDF data and adds to/modifies the JDF data. The JDF data is then transmitted to the print manager 115. Note that the JDF parser may be incorporated into the imposing/binding setting application.

Once the created JDF data has been passed to the print manager 115, the JDF parser in the print manager 115 interprets the JDF data, and the job on the digital print section is executed. For example, attributes such as output paper size, two-sided/one-sided printing and N-up are designated in the JDF data. The print manager 115, in accordance with the content of the JDF data, processes PDL data such as PDF/PS referred to by the JDF data using the PDL controller, and executes printing on an MFP via the printer interface.

The created JDF data is then passed to the postprocessing manager 116, where the JDF parser in the postprocessing manager 116 interprets the JDF data, and the job on the postpress section 214 is executed. For example, attributes such as case binding, saddle stitch binding and cutting are designated in the JDF data, and the postprocessing manager 116, in accordance with the content of the JDF data, executes postprocessing on the finisher A and the finisher B via the finisher A interface and the finisher B interface.

The archive manager 117 is a server that archives data such as the customer information of end users (name, contact details, credit card number, etc.) and the print data of received jobs in case an end user places a reorder using the same manuscript. Print data that is archived includes document/manuscript data files for printing, print condition settings associated with the document/manuscript data files, and other print request information. In the case of a request to bind a paper manuscript having been received, print data that is archived includes scan image file obtained by scanning the paper manuscript for copying, copy condition settings associated with the scan image data, and other copy request information.

Archived information is for responding promptly in the case where a reprint request is subsequently received, by calling the archived information and collating/referring to the customer information, the previous job and the like. File configurations include application file data, PDL data, and print-ready data (i.e., ripped data comprising an actual bitmap file or in compressed format such as a TIFF file). Alternatively, one or a number of these file configurations can be archived according to the use application such as intermediate data of these file configurations (i.e., an intermediate entity between PDL data and print-ready data, such as a display list, though not final output). When archiving, print-ready data, being voluminous, is recorded in a separate storage medium (CD-ROM, MO, ZIP, etc.), and even with PDL data, old or voluminous data is similarly archived on a separate medium. Stored data can also be sent back with the final output if the user so desires.

The archive manager 117 thus performs control such that whenever a reprint request is issued by an end user, the job data of that user can, at that time, be read out from the storage medium and reprinted according to desired printout conditions.

On the other hand, the user may also issue a reprint request by restoring archived data. For example, the manuscript data of a print job received by the order/manuscript reception manager 112 from the client PC of an end user environment is stored as-is in a memory unit of the archive manager 117. Holding this data for a fixed period enables a reorder to be processed without the manuscript data being resent from the end user, when the end user places a reorder for a print job using the same manuscript.

Also, after importing manuscript data as image data by scanning a paper manuscript received from an end user, the image data can be held in the archive manager 117. This enables a reorder to be processed without the end user resending the paper manuscript, when a reorder for the same manuscript is placed.

Further, after a print job or a copy job has been printed in the output configuration desired by the end user, the final document/image file before printing edited by the operator and the printed final print data is held for a fixed period in the archive manager 117. This enables the work involved in the editing process step when a reorder is received from the end user to be reduced. Note that the output configuration is designated in the print condition settings and other print request information, or in the copy condition settings and other copy request information.

Exemplary Job Execution Procedure

Figure 8:
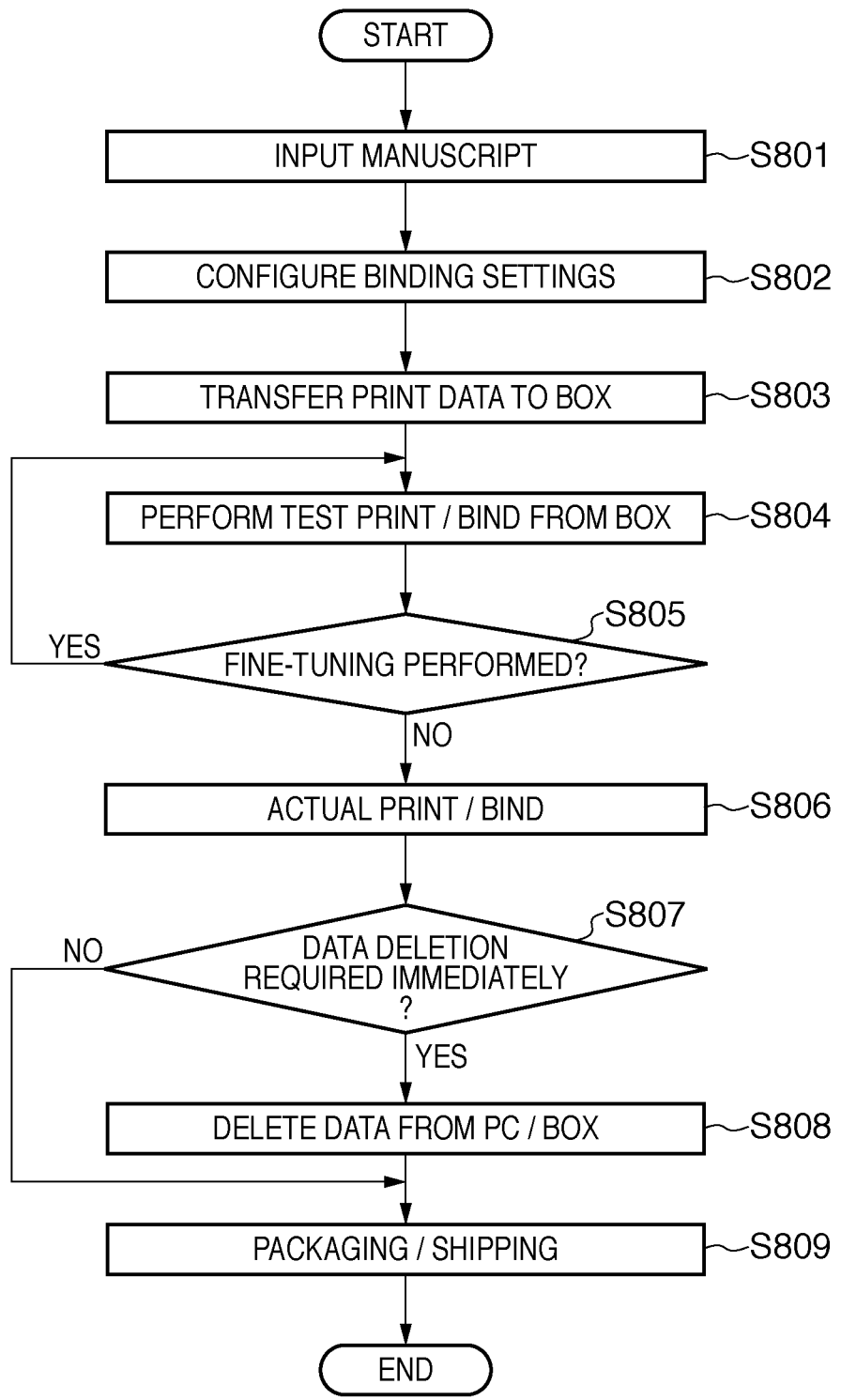
FIG. 8 is a flowchart of a printing/binding process according to the present invention.

Hereinafter, operation (step S808 in FIG. 8) of the data deletion section, which is a feature of the present application, will be described using FIGS. 7 to 9. FIG. 8 shows a processing procedure in the printing system when a defined workflow is executed. The workflow in FIG. 8 is defined in accordance with the example in FIG. 7.

Firstly, when a job ticket (i.e., JDF data) is transmitted to the order/manuscript reception manager 112, the order/manuscript reception manager 112 inputs the manuscript in accordance with the job ticket (S801). Once the manuscript has been input, the manuscript data is saved to a folder designated in the JDF data, for example. In the present embodiment, manuscript data received by the order/manuscript reception manager 112 is imported to the manuscript editing manager 113, which is executed by a computer (PC). The process step management manager 111 then receives a job ticket indicating that the manuscript input process is completed. The data deletion section 117*a* also performs processing (described below) after receiving a report (processing completion job ticket) of the completion of each process step of the workflow. This report may be received from the process step management manager 111 or may be received directly from each device. If a parameter value is adjusted (changed) in a device, the adjusted parameter (i.e., print setting item) and the setting value (amount of change) after adjustment (change) are transmitted to the process step management manager 111 (and/or the data deletion section 117*a*). Note that because the process steps are similar with regard to transmission of the job ticket and the processing completion report (only content differs), related description will be omitted when describing subsequent process steps.

Next at step S802, binding settings are configured by the manuscript editing manager 113.

Next at step S803, the manuscript editing manager 113 transfers the print data to a BOX, which is the HDD of the printing device that will be used for printing (e.g., color MFP, etc.), via the print manager 115.

Next at step S804, the printing device performs a test print/bind from the BOX. For example, a printing device such as a printer or an MFP performs a test print/bind as a result of the user selecting the Print button after selecting the print data of a document in the BOX via a user interface. Binding is performed using an in-line finisher or a near-line finisher. These printing apparatuses and finishers (postprocessing apparatuses) are called "binding devices" or simply "devices" in the present specification.

Next at step S805, the printing apparatus determines whether fine-tuning is required. The printing apparatus fine-tunes the print positioning and positioning related to the binding based on the result of the test print/bind. If fine-tuning has been performed, the processing returns to step S804, and the test print/bind is performed again. If fine-tuning has not been performed, the printing apparatus performs the actual print/bind. With the actual print/bind, the number of copies originally required, say, 100 copies, for example, is printed/bound. If fine-tuning has been performed, the name of the device and name of the item that were adjusted and the adjustment amount are transmitted to the process step management manager 111 as a report (S806).

Next at step S807, the process step management manager 111 determines whether data deletion is required immediately. In the case of printing confidential information, the process step management manager 111, at step S808, instructs that data remaining in the BOX and the servers be deleted in accordance with a designated deletion mode. If this is not the case, data remaining in the BOX and the servers is often held for a while in case of a reprint. Note that step S808 will be detailed using FIGS. 9A and 9B.

Next at step S809, packaging and shipping are performed to complete the series of printing/binding processes.

In the case of printing highly confidential data, printing is often performed with the customer present. In this case, data in the BOX used for the test print and the actual print is manually deleted and checked on the POD device at the same time that the printed material is acquired, as shown in steps S807 and S808.

Here, step S808 will be described in detail using FIGS. 9A and 9B. Firstly at step S901, the archive manager 117 stores a deletion mode designated by the operator. With the deletion mode, the operator is able to select automatic deletion mode on/off, and in the case of automatic deletion mode on, sequential deletion mode on/off.

The deletion mode instruction from the operator may be set from any one of the UI of the archive application in the archive manager, the UI of the imposing/binding setting application in the manuscript editing manager 113, and the UI of the MFP that will perform the printing. The set data is held in the data deletion section of the archive manager.

The archive manager 117, the process step management manager 111, the manuscript editing manager 113, the print manager 115 and the postprocessing manager 116 are connected by a network as shown in FIGS. 1 and 2, and exchange information as necessary.

Next, when document whose actual printing has completed is selected with the BOX UI of the MFP after the actual printing is completed at step S806 in FIG. 8 and the Delete button is pressed, the archive manager 117 determines at step S902 whether auto delete is designated. If auto delete is designated, the processing proceeds to step S903. If auto delete is not designated, the processing proceeds to step S910.

Next at step S903, the archive manager 117 determines whether sequential deletion mode is designated. Sequential deletion mode is a mode in which the time for which data related to the confidential data of a customer remains on the devices is minimized by deleting print data and the like at the completion of each process step performed by a device. Sequential deletion mode will now be described.

In step S904, the archive manager 117 determines whether processing by a single device is completed. For example, this may be determined as a result of JDF data being output from the print manager 115 of FIG. 7, or by monitoring the status of the MFP. In the case of a plurality of MFPs being used such as with color/monochrome distributed printing, the completion determination is performed by monitoring each MFP. Note that in the case of a plurality of consecutive process steps being executed by a single device, it is determined that the processing by the device is completed when all of these process steps have been completed.

Figure 12:
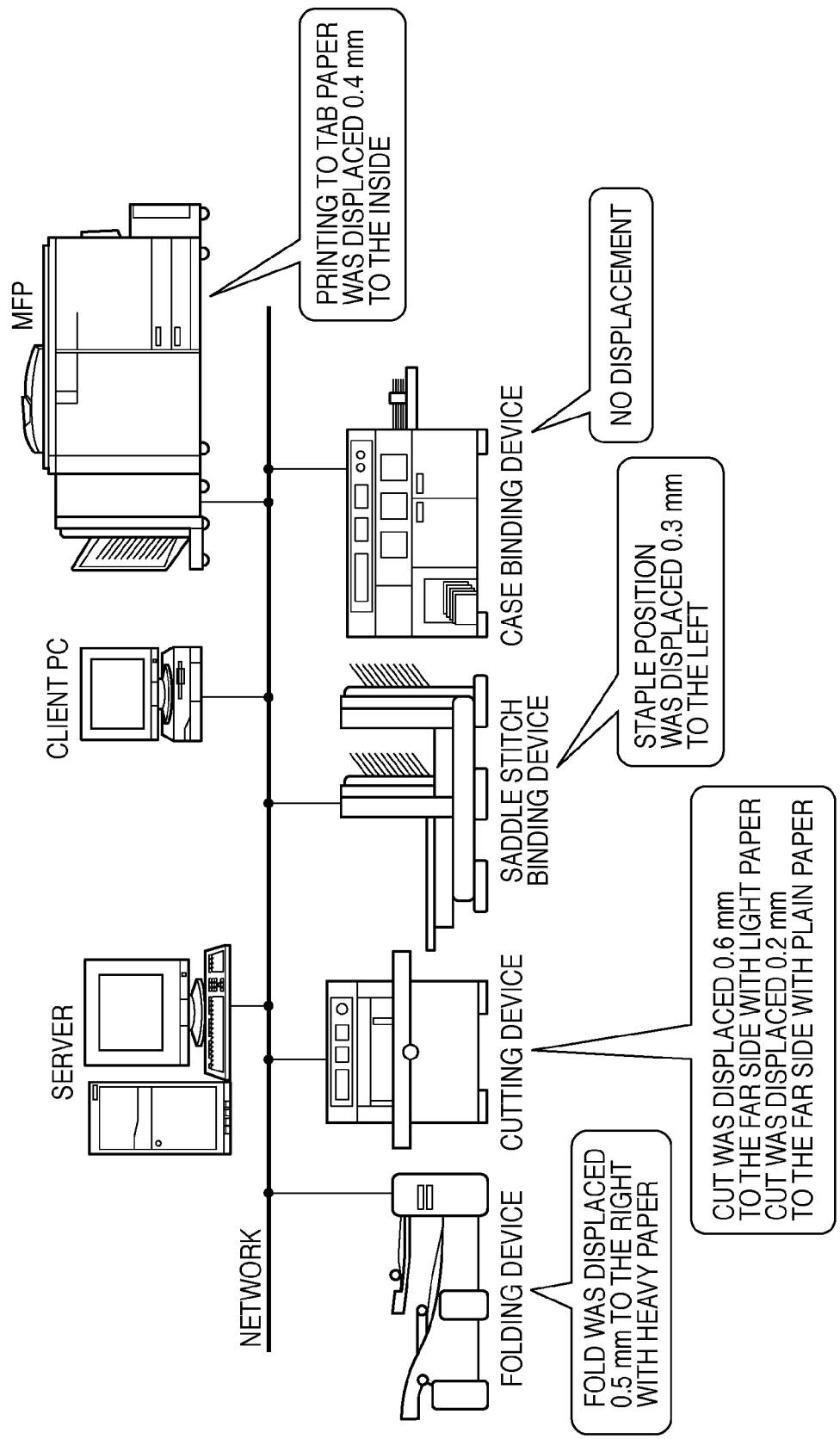
FIG. 12 shows exemplary amounts of fine-tuning according to the present invention.
Figure 20:
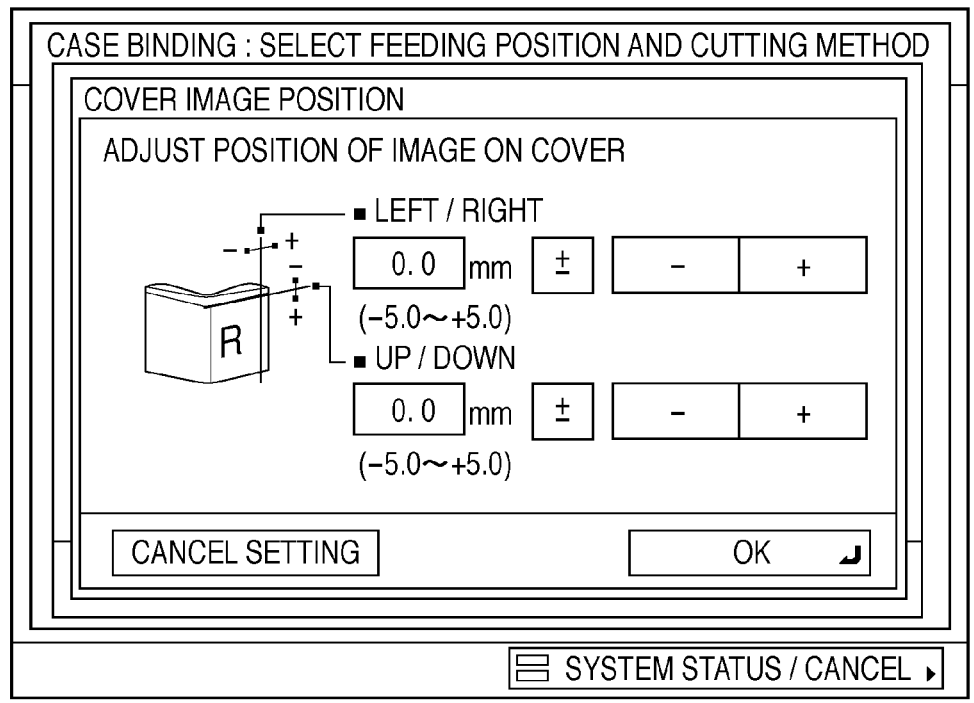
FIG. 20 shows exemplary fine-tuning according to the present invention.
Figure 21:
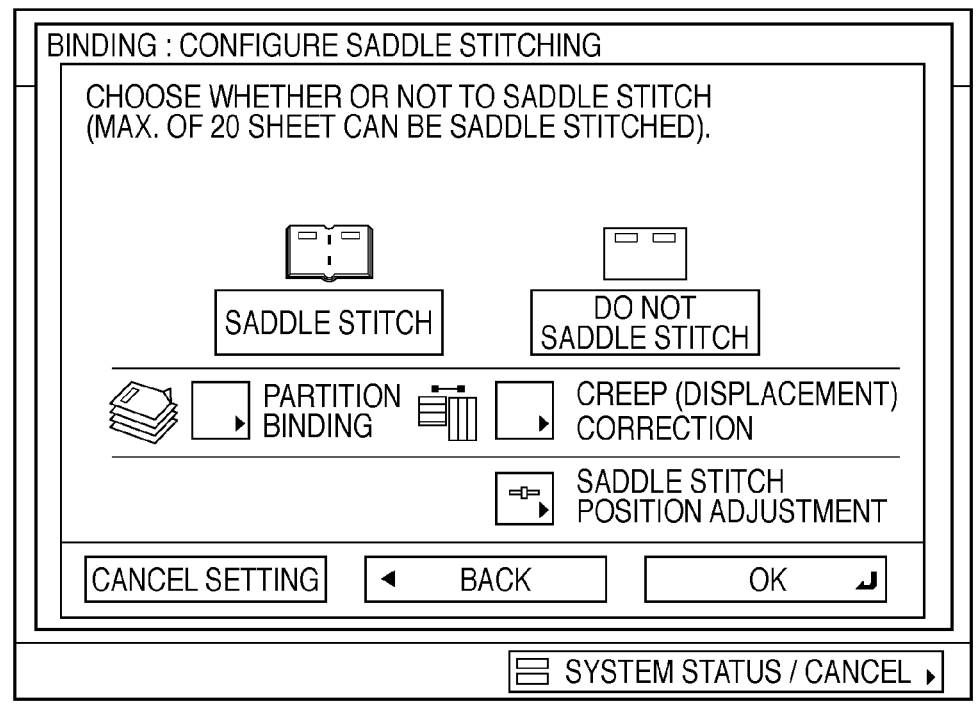
FIG. 21 shows exemplary fine-tuning according to the present invention.

Next at step S905, the archive manager 117 determines whether fine-tuning has been performed in the device. Exemplary fine-tuning that occurs in the devices is shown in FIG. 12. Exemplary fine-tuning UIs are shown in FIG. 20 involving positional adjustment of the cover in case binding, and in FIG. 21 involving positional adjustment in saddle stitch binding. If fine-tuning has been performed, the processing proceeds to step S906. If fine-tuning has not been performed, the processing proceeds to step S907.

In step S906, the archive manager 117 collects the job ticket updated with the values fine-tuned in the device. Collecting involves the archive manager 117 receiving the job ticket in which the fine-tuning content has been written from the device via the process step management manager 111. This is to reduce needless test printing and raise work efficiency by not having to perform the same fine-tuning at the time of reprinting.

Next at step S907, the archive manager 117 instructs the devices to delete all relevant data associated with the print job in each respective device. Relevant data is all data associated with the client such as print data used in printing or binding, other data used temporarily, JDF data, and the like. Deletion is performed after receiving acknowledgment that the archive manager 117 (data deletion section 117a, in particular) has received the job ticket at step S906.

Next at step S908, the archive manager 117 determines whether all of the processing is completed. If all work instructions including print/bind designated by the process step management manager 111, the manuscript editing manager 113 and the like have been completed, processing proceeds to step S909. If there is processing that has not been completed, processing returns to step S904 and is similarly repeated.

At step S909, the archive manager 117 substitutes the fine-tuned JDF data for the JDF data saved in case of a reprint.

Next at step S910, the archive manager 117 erases or changes the customer data name in the JDF data substituted as a result of S909. An exemplary modification of JDF data will now be shown.

Original JDF Data

```
<JDF>
<JDF Type="LayoutPreparation" ID="id001">
<ResourcePool>
<RunList>
    <LayoutElement>
        <FileSpec URL="http://www.insatsu_ya.com/customer/kaisha/soshiki/hyou.pdf"/>
    </LayoutElement>
</RunList>
...
</ResourcePool>
</JDF>
```

Modified JDF Data

```
<JDF>
<JDF Type="LayoutPreparation" ID="id001">
<ResourcePool>
<RunList>
    <LayoutElement>
        <FileSpec URL=""/>
    </LayoutElement>
</RunList>
...
</ResourcePool>
</JDF>
```

The archive manager 117 thus prevents the leaking or inferring of customer information by deleting information relating to the drawing data from the JDF data of the target print job currently targeted for processing. In the above example, the filename of the manuscript data has been erased from the <FileSpec URL=" "/> tag.

At step S911, the archive manager 117 deletes the original customer data, the print data and the like. Note that the JDF data is held for reprinting because the customer information has been deleted at step S910.

Next, processing will be described in the case where, at step S903, the sequential deletion mode is not designated. If the sequential deletion mode is not designated, data related to the customer is deleted once processing has been completed as far as a process step set by the operator. The case will now be described where, for example, the settings have been configured such that data is deleted when it is confirmed that shipping has been completed.

At step S912, the archive manager 117 confirms, via the process step management manager, that processing designated in the work instructions such as printing, binding, packaging and shipping has been executed. Next at step S913, the archive manager 117 determines whether fine-tuning was performed in the device that executed the process step. In step S914, the archive manager 117 collects and holds the fine-tuned job ticket (i.e., JDF data). In the FIG. 12 example, printing to tab paper was displaced 0.4 mm to the inside, so the user fine-tunes such that printing to tab paper is displaced 0.4 mm to the outside. That is, the print manager 115 or the MFP modifies numerical values in the JDF data such that printing to tab paper is displaced 0.4 mm to the outside.

In step S915, the archive manager 117 determines whether processing up until the set process step has been completed. Here, the settings have been configured to delete data when shipping is completed, so process proceeds from printing by an MFP in the print manager 115 to binding, packaging and shipping by finishers in the postprocessing manager 116. Customer data and related data are not deleted during this time.

The archive manager 117, on receipt of JDF data indicating that the shipping process has been completed via the process step management manager 111, instructs that all related data in the devices up until the set process step (here, shipping) be deleted (S916). That is, devices such as the servers, the imposing/binding setting application, the MFP and the finishers delete print data and JDF files in accordance with the instruction of S916. Next, processing proceeds to step S909 and is similarly performed as described above.

Exemplary Reprinting Process

Next, the reprinting process will be described in the case where a repeat order is placed awhile after the actual printing and shipping. Note that when placing a repeat order the customer transmits identification information specifying the JDF data he or she wants to use in the reprint and information relating to the content data used last time. Here, the information relating to the content data may be the actual content data (e.g., PDF data) or the pathname where the content data is located. The archive manager 117 retrieves the JDF data to be used in the reprint based on the identification information received from the customer when the repeat order is placed.

The repeat order of a high confidentiality order will now be described. In the case where all highly confidential data including the original data and print data of a customer has been deleted, the archive manager 117 retrieves the JDF data to be used in the reprint using the identification information of the JDF data. While the customer data name is deleted at S910 in FIG. 9A as described above, the identification information of the JDF data is not deleted, enabling the archive manager 117 to retrieve the JDF data to be used in the reprint.

Next, the archive manager 117 inserts the information relating to the content data notified by the customer when the repeat order was placed into the place for indicating the manuscript in the JDF data. Next, the archive manager 117 transmits the JDF data in which the information relating to the content data has been written to the manuscript editing manager 113, checks the imposing/binding settings, and then passes the JDF data to the print manager 115. An MFP connected to the print manager 115 performs printing in accordance with the received JDF data, and finishers connected to the postprocessing manager 116 similarly perform a binding process.

The system is thereby able to handle repeat orders for both high confidentiality orders and normal orders. Also, the work involved in a repeat order is reduced for high confidentiality printed material, in comparison with the work involved in the initial order.

As a result of the above processing, customer data and print data are completely deleted, inference of customer data from JDF data is prevented, and the time and effort involved in reconfiguring the settings when reprinting is eliminated. Also, security is enhanced by deleting data remaining on the devices after the completion of each process step.

Note that confidentiality related information may be erased when all process steps included in the job ticket of the target print job are completed, or immediately after the job ticket is sent to the device that performs the first process step of the workflow.

Second Embodiment

Next a second embodiment will be described. While an example was described in the first embodiment in which the data deletion section was included in the archive manager 117, the location of the data deletion section is not particularly limited. Similar effects to the first embodiment can be obtained even if the data deletion section resides in another server or device such as the manuscript editing manager 113, the print manager 115 or an MFP, for example.

Third Embodiment

Figure 10:
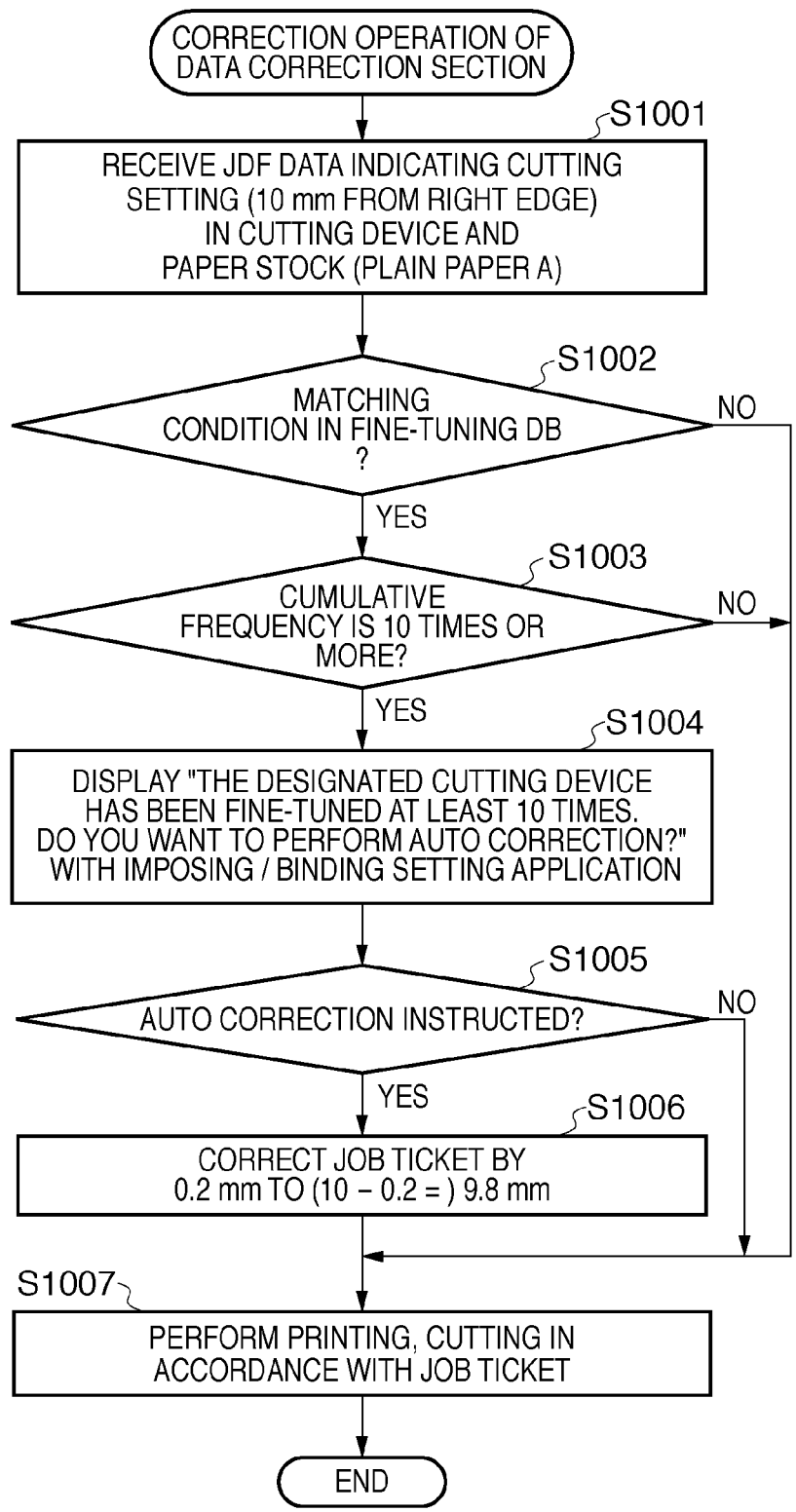
FIG. 10 is a flowchart of a data correction process according to the present invention.
Figure 13:
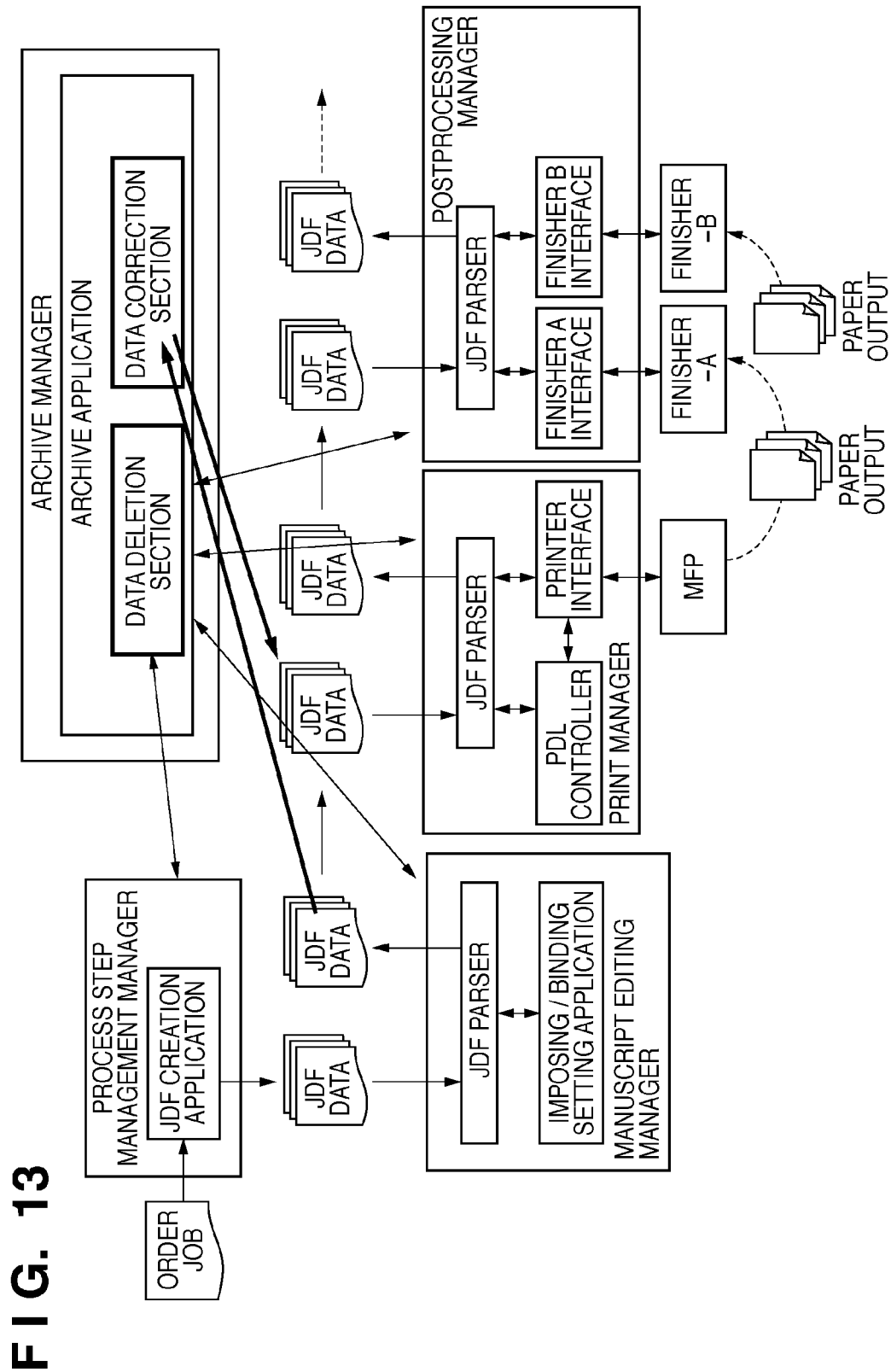
FIG. 13 shows an exemplary correction process according to the present invention.

Next a third embodiment will be described. FIG. 10 is a flowchart of a data correction process that is performed together with the data deletion process according to the third embodiment. FIG. 12 is a conceptual diagram showing fine-tuning required in the devices according to the third embodiment. FIG. 13 is a conceptual diagram showing an outline of processing according to the third embodiment. FIG. 16 shows exemplary data in a fine-tuning database held by the archive manager 117. The third embodiment will now be described using these figures.

In the first embodiment, JDF data reflecting values fine-tuned in the devices was held in the archive manager 117 so as to also be usable when reprinting, thereby reducing the time and effort involved in reprinting. In the present embodiment, an example will be described in which the time and effort of fine-tuning is reduced by also making use of fine-tuning performed in the past with new orders rather than only when reprinting. Consider the case where, for example, fine-tuning is required in the devices in order to obtain a desired result set with the imposing/binding setting application in the printing/binding process.

FIG. 12 is a conceptual diagram showing exemplary displacement with the condition of the paper and the like that occurred in the devices. In the test print (bind), for example, the fold made by the folding device was displaced 0.5 mm to the right when using heavy paper, so the user fine-tunes the folding device to fold the paper at a position displaced 0.5 mm to the left. Similarly, the cut made by the cutting device was displaced 0.6 mm to the far side in the case of light paper, and 0.2 mm to the far side in the case of plain paper, so the user fine-tunes the cutting device to respectively cut at a position displaced 0.6 mm and 0.2 mm to the near side.

Figure 9A:
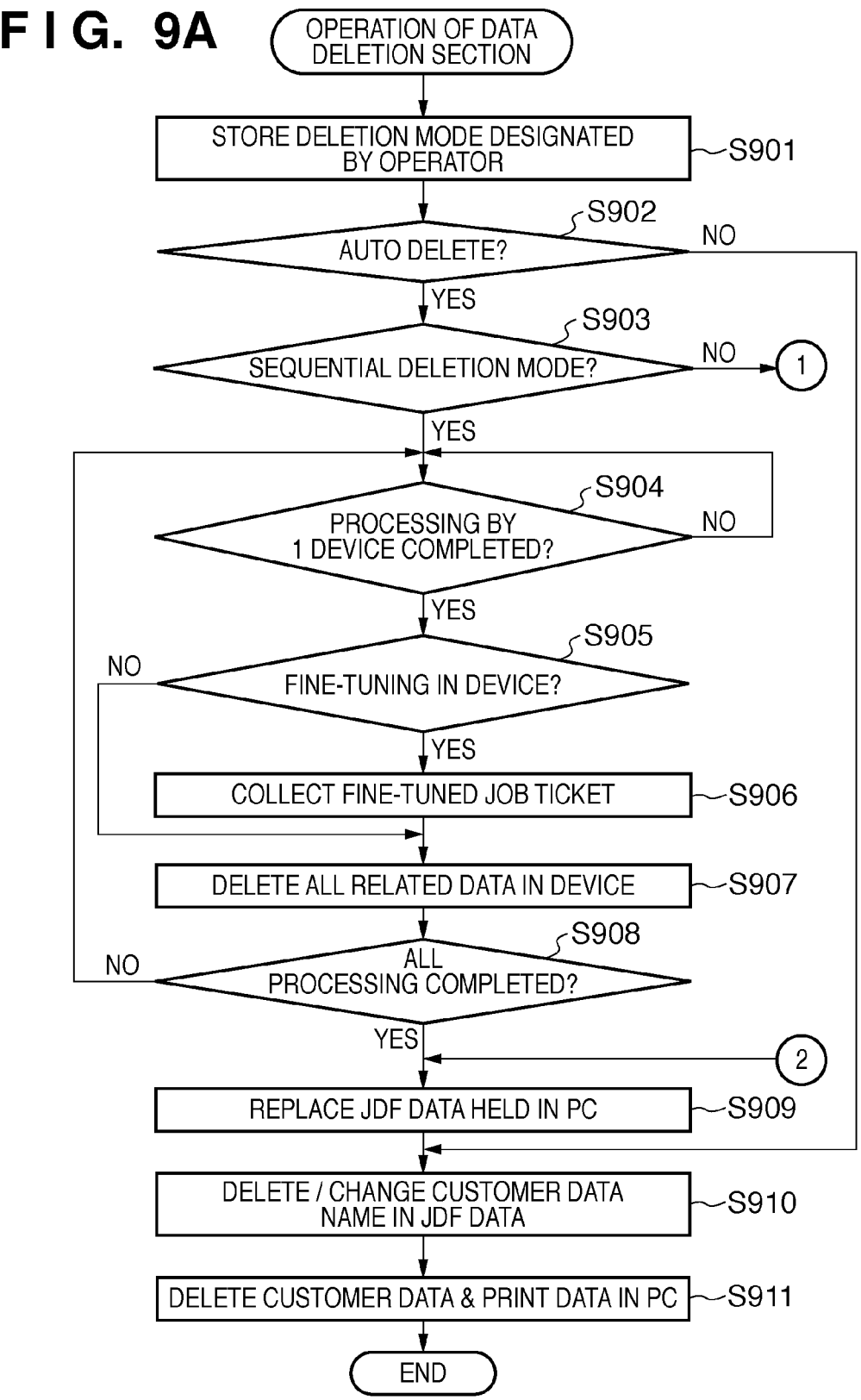
FIGS. 9A and 9B are flowcharts of a data deletion process according to the present invention.
Figure 9B:
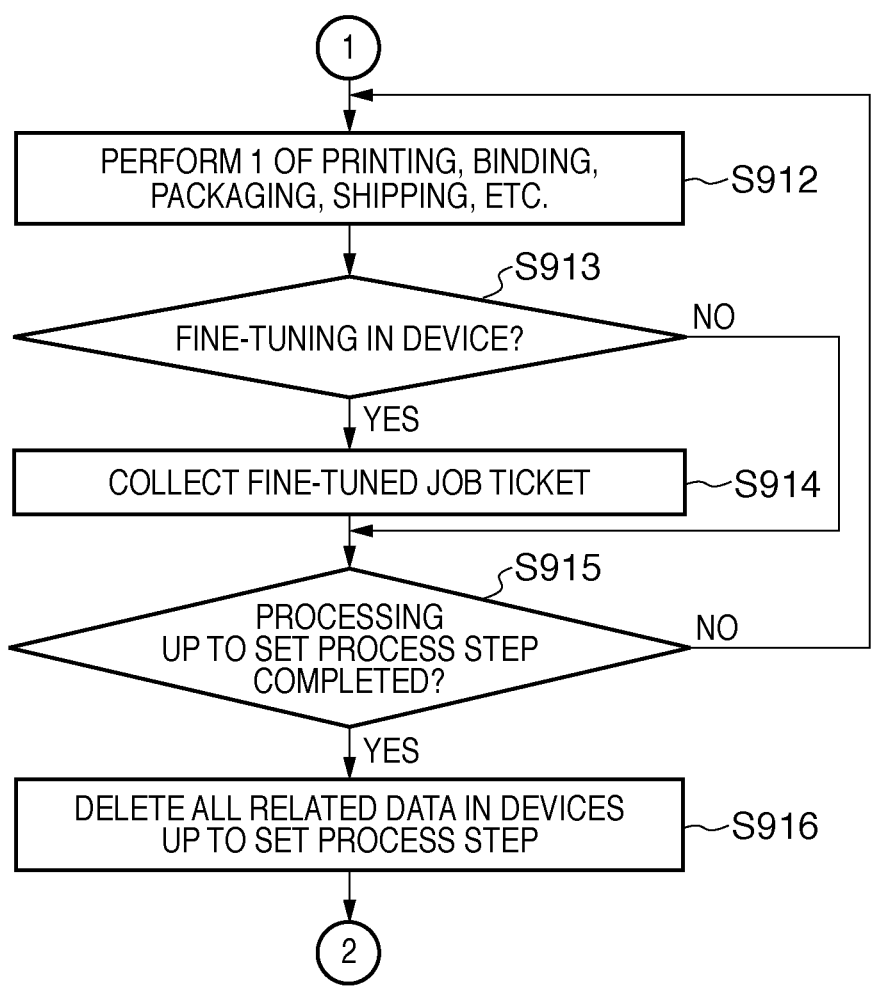

The archive manager 117 collects the JDF data reflecting the result of this fine-tuning at step S906 of FIG. 9A or S914 of FIG. 9B.

Some of the results obtained from entering the fine-tuned setting items and the adjustment amounts from the collected JDF data in the database are shown in FIG. 16. For example, the uppermost data shows that previously printing to tab paper was displaced 0.4 mm to the inside once in Printer A.

An exemplary correction operation by a data correction section that corrects print settings (binding settings) will be described using the flowchart of FIG. 10. The data correction section is, for example, executed by the process step management manager 111, and performs correction prior to the job ticket being transmitted to the device of each process step. For example, correction can be performed immediately after processing by the order/manuscript reception manager 112 is completed, so as to be checked by the operator in the process step performed by the manuscript editing manager 113. Correction may, of course, be executed at a different timing in another manager.

At step S1001, the data correction section receives JDF data indicating to configure the cutting setting in the cutting device to 10 mm from the right edge and to use plain paper A as the paper stock.

At step S1002, the data correction section searches the fine-tuning database for attributes relating to paper type. In this case, the search condition is "paper stock=plain paper A". Because the fine-tuning database shown in FIG. 16 includes a condition where plain paper A is used with the cutting device, for example, the processing proceeds to step S1003.

At step S1003, the data correction section refers to the cumulative frequency included in the retrieved item, and determines whether the cumulative frequency is greater than or equal to ten. If greater than or equal to ten, the processing proceeds to step S1004. If not greater than or equal to ten, the processing proceeds to step S1007. In the FIG. 16 example, the database reveals that the cutting device has been displaced 0.2 mm to the far side on ten occasions when cutting plain paper A, so processing proceeds to step S1004.

At step S1004, the data correction section causes the imposing/binding setting application of the manuscript editing manager 113 to display, "The designated cutting device has been fine-tuned at least 10 times. Do you want to perform auto correction?"

Next at step S1005, the data correction section receives an instruction from the manuscript editing manager 113, and determines whether auto correction has been instructed.

In step S1006, the data correction section corrects the 10 mm cutting position by 0.2 mm to (10−0.2=) 9.8 mm, generates a job ticket (JDF data) according to which cutting is performed at a position 9.8 mm from the near side, and transmits the generated job ticket to the print manager 115.

Next at step S1007, printing and cutting are performed in accordance with the job ticket (JDF data).

As described above, similar effects to the first embodiment are also achieved if the data correction section is included. Additionally, the time and effort of fine-tuning in the devices is also reduced when a new order is placed rather than only when reprinting.

Fourth Embodiment

Figure 14:
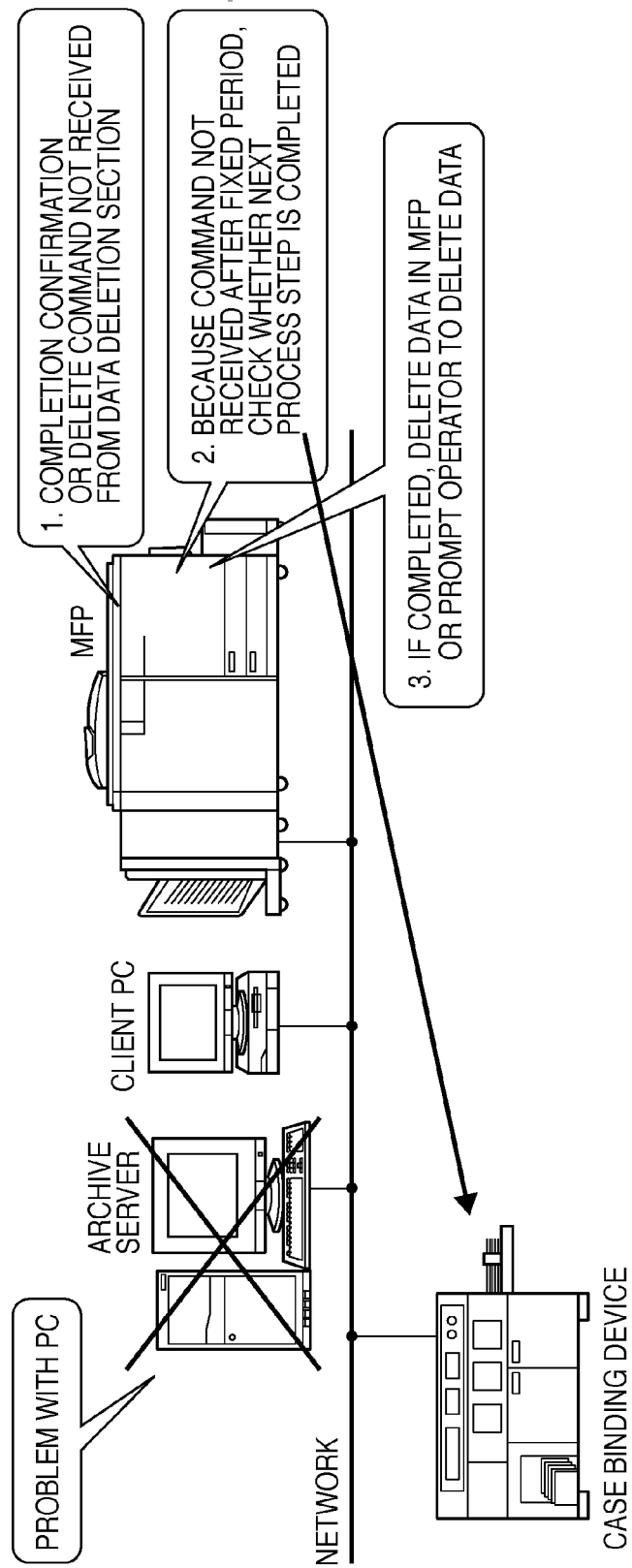
FIG. 14 shows an example in which a problem occurs with an archive manager 117 according to the present invention.

Next a fourth embodiment will be described. FIG. 14 is a conceptual diagram of when a problem occurs with the archive manager 117 or the network.

In the first embodiment, the confidential information of customers can be reliably deleted, and the time and effort of fine-tuning can also be reduced when reprinting. However, if a processing completion confirmation (device status monitoring) or a delete command for print data or the like is not received from the data deletion section due to a problem with the archive manager 117, the print data of the customer could remain on a device indefinitely.

In view of this, in the present embodiment, a BOX control section in an MFP, for example, measures the passage of a prescribed time period after processing by the device (e.g., after actual printing in the case of an MFP). If a processing completion confirmation or a delete command for print data or the like is not received from the data deletion section within the prescribed period, the processing status of the downstream device is determined. If the downstream processing has been completed, it is judged to be acceptable to delete the data, and auto deletion of data in the device is performed. If necessary, the fine-tuned JDF data is collected and held.

Note that this processing may be performed by another manager such as the print manager 115, the imposing/binding setting application, or a plurality of these modules. The processing status of the downstream device denotes, for example, the status of a finisher that performs the binding or the status of the packaging/shipping process. The question of whether to also delete the data of the other device that has completed processing and what data to delete depends on the settings configured by the operator beforehand.

Similar effects to the first embodiment can thus be obtained in the fourth embodiment. Additionally, failing to delete print data due to a fault with the archive manager or a fault with the network connecting to the archive manager can be prevented, enabling the degree of data protection to be further improved.

Fifth Embodiment

Next a fifth embodiment will be described. FIG. 15 is a conceptual diagram of when a problem occurs with a device or network according to the fifth embodiment.

In the first embodiment, the confidential information of customers can be reliably deleted, and the time and effort of fine-tuning can also be reduced when reprinting. However, if a response is not received to a completion confirmation (device status monitoring) of the data deletion section due to a problem with one of the devices (power or network down, etc.), the print data of the customer could remain on the device indefinitely.

In the present embodiment, the data deletion section sends a completion confirmation to the device (e.g., finisher) or manager (server) downstream of the device (e.g., MFP) or manager (server) that is not responding. If a completion notification is received, it is judged that the processing by the device or manager (server) that is not responding has been completed, and the data deletion process is performed. If a completion notification is not received from a device, a warning is issued to the archive manager (server), or to the imposing/binding setting application, or to the UI panel of an MFP or the like, prompting the operator check the device directly.

Similar effects to the first embodiment can thus be obtained in the fifth embodiment. Additionally, failing to delete print data due to a fault with a device or a fault with the network connecting the device and the archive manager can be prevented, enabling the degree of data protection to be further improved.

Sixth Embodiment

Figure 17:
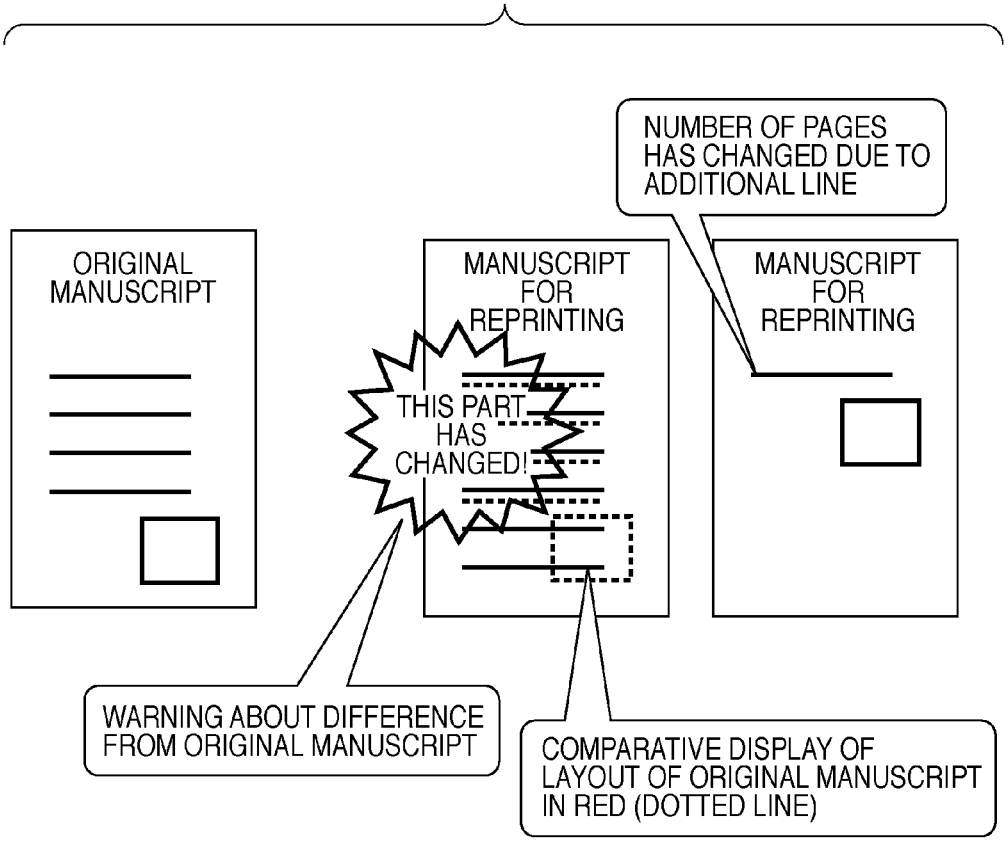
FIG. 17 shows an example in which customer manuscript data differs at the time of reprinting according to the present invention.

Next a sixth embodiment will be described. FIG. 17 is a conceptual diagram of the case where the page composition differs due to manuscript data provided by a customer at the time of reprinting having been updated according to the sixth embodiment.

In the first embodiment, the confidential information of customers is reliably deleted, and the time and effort of fine-tuning can also be reduced when reprinting. However, printing/binding could be performed incorrectly if the manuscript data provided by the customer at the time of reprinting has been updated, and this is not noted. The binding composition is affected particularly in the case where the page composition has changed.

In the present embodiment, the data deletion section stores the document composition such as the number of pages, bounding rectangles around text, the position of images/graphics, the chapter structure, the form of variables, and the position of annotations, together with the binding settings, and derives a hash value of the manuscript data. The data deletion section derives a hash value of the manuscript data provided by the customer at the time of reprinting and compares this with the held hash value. The targets for comparison are the new manuscript data and manuscript data that satisfies conditions designated by the customer.

It can be judged that the data is different if the hash value of the data provided by the customer at the time of reprinting differs from the hash value of previous data. As a result, a warning is issued on the imposing/binding setting application, and binding settings associated with the hash value saved as the target for comparison are displayed on a manuscript preview for confirmation by the client. Modification of the manuscript data or the printing/binding settings is thus facilitated.

Seventh Embodiment

Figure 18:
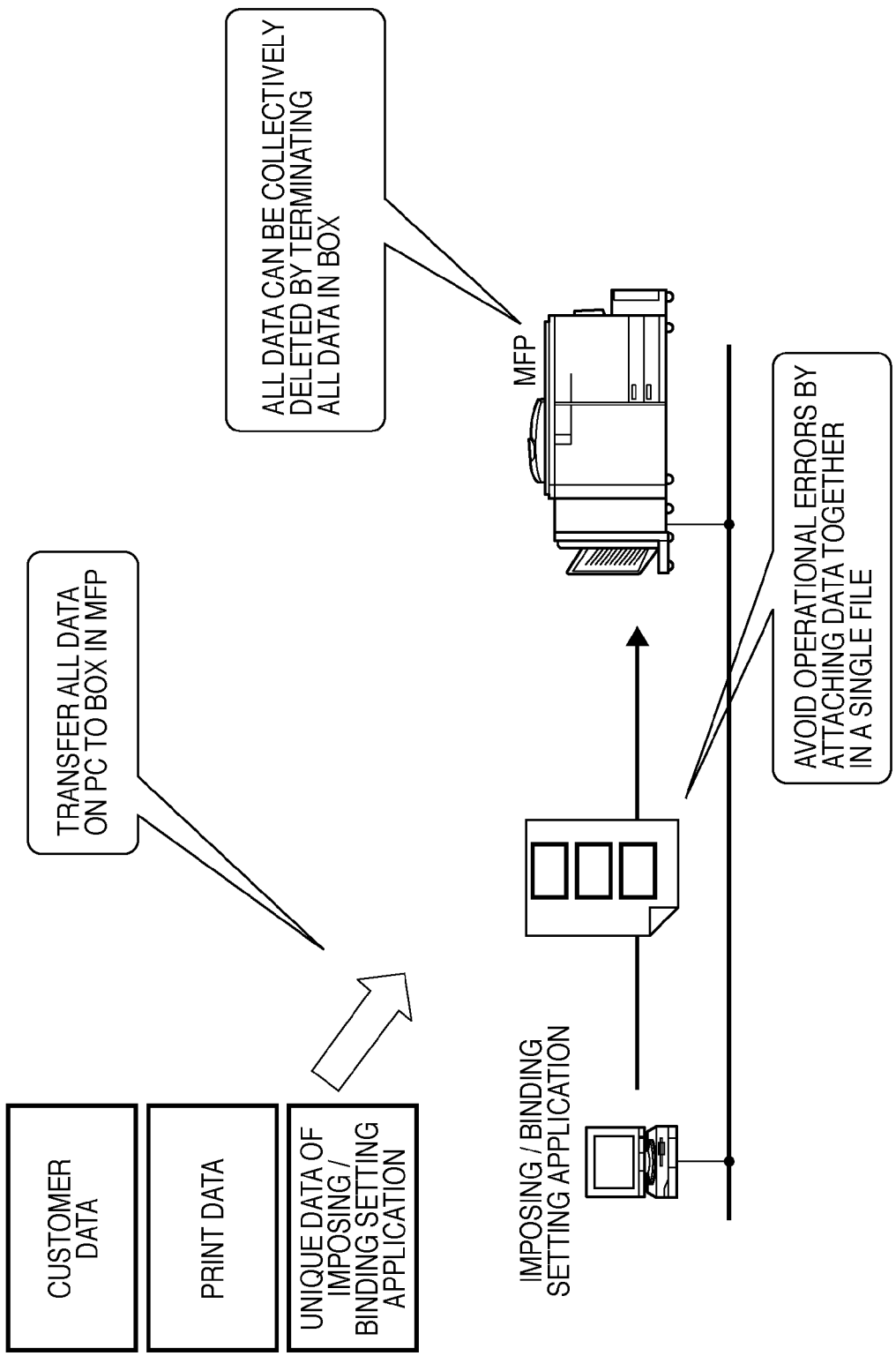
FIG. 18 shows an example in which data is centralized in an MFP according to the present invention.

Next a seventh embodiment will be described. FIG. 18 is a conceptual diagram of the case where all of the confidential data of a customer is transferred to a device according to the seventh embodiment.

In the first embodiment, the confidential information of customers is reliably deleted, and the time and effort of fine-tuning can also be reduced when reprinting. However, applications and devices in a POD workflow may not always be produced by the same manufacture, and it may not be possible, in a collaborative case where data is output to devices of other manufacturers, to perform control such as deletion of files on the device of another manufacturer.

In the present embodiment, the data deletion section transmits all confidential information of the customer including the original manuscript data to the MFP via the print manager 115 together with the JDF data, if deletion of print data in devices, particularly MFPs, cannot be controlled in the case where devices of different manufacturers are operating together. Data remaining on the archive manager 117, the imposing/binding setting application of the manuscript editing manager 113 and the like is deleted. As for a method of consolidating confidential data as one with the JDF data, operations can be performed exactly the same as the conventional way by consolidating confidential data as an internal attachment in a PDF file constituting manuscript data, for example.

Figure 11:
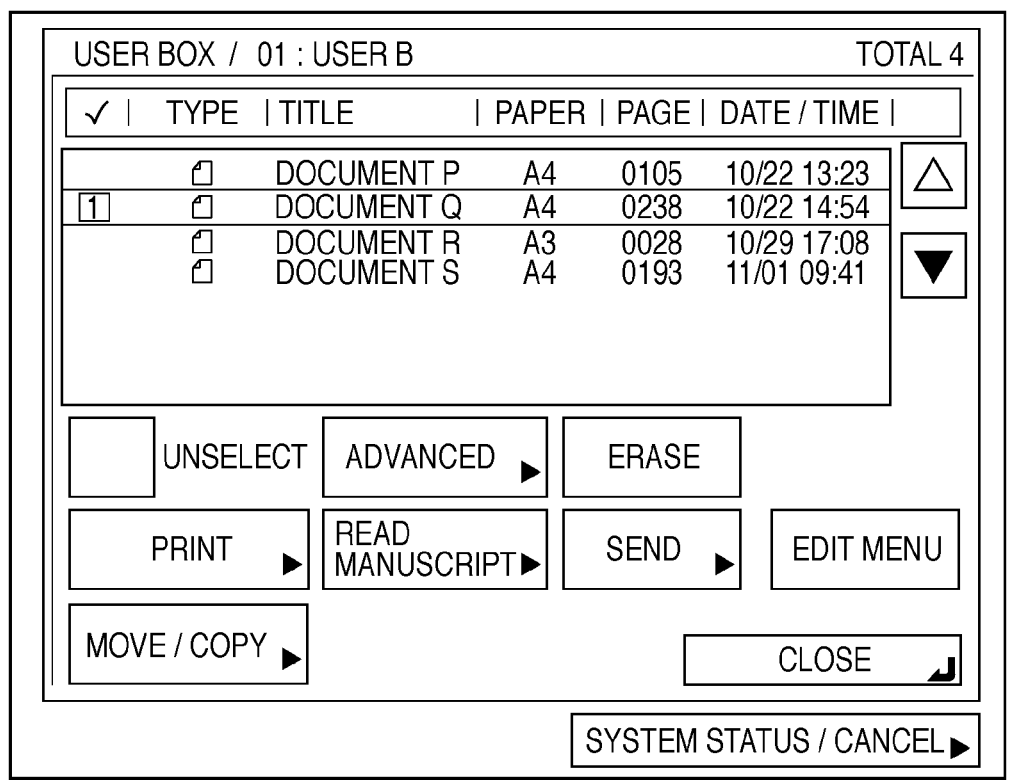
FIG. 11 shows an exemplary UI of a BOX according to the present invention.

Then, when the actual printing in the MFP is completed or the binding is completed, all of the data of the customer can be collectively deleted by deleting the data in the BOX as shown in FIG. 11. All data can thus be completely deleted without data remaining on the servers or the like.

Note that the present invention may be applied to a system constituted by a plurality of devices (e.g., host computer, interface device, reader, printer, etc.) or an apparatus composed of a single device (e.g., copier, facsimile machine, etc.). The object of the present invention may also be achieved by a storage medium storing a program for realizing the functions of the foregoing embodiments being supplied to a system or an apparatus, and a computer of the system or apparatus reading out and executing the program stored on the storage medium. In this case, the actual program read out from the storage medium realizes the functions of the foregoing embodiments, and the actual program and the storage medium storing the program constitute the present invention.

The present invention also encompasses the case where an operating system (OS) or the like running on the computer performs part or all of the actual processing based on instructions in the program, with the functions of the foregoing embodiments being realized as a result of this processing. Further, the present invention is also applied in the case where the program read out from the storage medium is written to a memory provided in a function expansion board inserted in the computer or a function expansion unit connected to the computer. In this case, a CPU or the like provided in the function expansion board or the function expansion unit then performs part or all of the actual processing based on instructions in the program, with the functions of the foregoing embodiments being realized as a result of this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-122778, filed May 8, 2008, which is hereby incorporated by reference herein in its entirety.

What is claimed is:

1. A printing control apparatus connected to first and second devices that process a print job that includes job definition information in which a parameter is defined and information relating to drawing data used in printing, the printing control apparatus comprising:
    a first determination unit configured to determine whether the parameter defined in the job definition information has been changed into a new parameter in the first device;
    a collection unit, configured to, if the first determination unit determines that the parameter has been changed into a new parameter, collect the job definition information defining the new parameter;
    a deletion unit configured to delete access information to access the drawing data from the collected job definition information;
    a holding unit configured to hold the job definition information from which the access information has been deleted;
    a second determination unit configured to determine whether to delete the print job, the second determination unit determining to delete the print job when print processing of confidential information is performed; and
    an instruction unit configured to:
        instruct the first device to delete the print job in response to completion of processing in the first device when the second determination unit determines to delete the print job and a first deletion mode has been set;
        instruct the second device to sequentially delete the print job in response to completion of processing in the second device after the first device has been instructed to perform deletion of the print job in the first device when the second determination unit determines to delete the print job and the first deletion mode has been set; and
        instruct the first and second devices to delete the print job in response to completion of processing in both the first and second devices when the second determination unit determines to delete the print job and a second deletion mode has been set,
    wherein the deletion unit is configured to:
        after the instruction unit sends the instruction to the second device to sequentially delete the print job in response to completion of processing in the second device, delete access information to access drawing data from the collected job definition information; and
        after the instruction unit sends the instruction to both the first and second devices to delete the print job in response to completion of processing in both the first and second devices, delete access information to access the drawing data from the collected job definition information,
    wherein the processing in the second device begins after completion of the processing in the first device.

2. A printing control method of a printing control apparatus connected to first and second devices that process a print job that includes job definition information in which a parameter is defined and information relating to drawing data used in printing, the printing control method comprising:

a first determination step of determining whether the parameter defined in the job definition information has been changed into a new parameter in the first device;

a collection step of, if the first determination step determines that the parameter has been changed into a new parameter, collecting the job definition information defining the new parameter;

a deletion step of deleting access information to access the drawing data from the collected job definition information;

a holding step of holding the job definition information from which the access information has been deleted;

a second determination step of determining whether to delete the print job, the second determination step determining to delete the print job when print processing of confidential information is performed; and an instruction step of:

instructing the first device to delete the print job in response to completion of processing in the first device when the second determination step determines to delete the print job and a first deletion mode has been set;

instructing the second device to sequentially delete the print job in response to completion of processing in the second device after the first device has been instructed to perform deletion of the print job in the first device when the second determination unit determines to delete the print job and the first deletion mode has been set; and instructing the first and second devices to delete the print job in response to completion of processing in both the first and second devices when the second determination step determines to delete the print job and a second deletion mode has been set, wherein the deletion step:

after the instruction step sends the instruction to the second device to sequentially delete the print job in response to completion of processing in the second device, deletes access information to access drawing data from the collected job definition information; and after the instruction step sends the instruction to both the first and second devices to delete the print job in response to completion of processing in both the first and second devices, deletes access information to access the drawing data from the collected job definition information, wherein the processing in the second device begins after completion of the processing in the first device.

3. A non-transitory computer-readable storage medium storing a program executable by a computer to execute a printing control method of a printing control apparatus connected to first and second devices that process a print job that includes job definition information in which a parameter is defined and information relating to drawing data used in printing, the printing control method comprising:

a first determination step of determining whether the parameter defined in the job definition information has been changed into a new parameter in the first device;

a collection step of, if the first determination step determines that the parameter has been changed into a new parameter, collecting the job definition information defining the new parameter;

a deletion step of deleting access information to access the drawing data from the collected job definition information;

a holding step of holding the job definition information from which the access information has been deleted;

a second determination step of determining whether to delete the print job, the second determination step determining to delete the print job when print processing of confidential information is performed; and an instruction step of:

instructing the first device to delete the print job in response to completion of processing in the first device when the second determination step determines to delete the print job and a first deletion mode has been set;

instructing the second device to sequentially delete the print job in response to completion of processing in the second device after the first device has been instructed to perform deletion of the print job in the first device when the second determination unit determines to delete the print job and the first deletion mode has been set; and instructing the first and second devices to delete the print job in response to completion of processing in both the first and second devices when the second determination step determines to delete the print job and a second deletion mode has been set, wherein the deletion step:

after the instruction step sends the instruction to the second device to sequentially delete the print job in response to completion of processing in the second device, deletes access information to access drawing data from the collected job definition information; and after the instruction step sends the instruction to both the first and second devices to delete the print job in response to completion of processing in both the first and second devices, deletes access information to access the drawing data from the collected job definition information, wherein the processing in the second device begins after completion of the processing in the first device.

4. The apparatus according to claim 1, further comprising:

a communication unit configured to communicate with the first device, wherein the first device deletes the print job without receiving the instruction for deletion of the print job from the print control apparatus within a predetermined time period after the first device processes the print job.

5. The apparatus according to claim 1, wherein the print job contains confidential information.

6. The method according to claim 2, further comprising:

a communication step of communicating with the first device, wherein the first device deletes the print job without receiving the instruction for deletion of the print job from the printing control apparatus within a predetermined time period after the first device processes the print job.

7. The method according to claim 2, wherein the print job contains confidential information.

8. The medium according to claim 3, wherein the method further comprises:

a communication step of communicating with the first device, wherein the first device deletes the print job without receiving the instruction for deletion of the print job from the printing control apparatus within a predetermined time period after the first device processes the print job.

9. The medium according to claim 3, wherein the print job contains confidential information.

* * * * *